United States Patent
Steinberg et al.

(10) Patent No.: US 7,953,250 B2
(45) Date of Patent: *May 31, 2011

(54) METHOD AND APPARATUS FOR RED-EYE DETECTION IN AN ACQUIRED DIGITAL IMAGE

(75) Inventors: Eran Steinberg, San Francisco, CA (US); Yury Prilutsky, San Mateo, CA (US); Petronel Bigioi, Galway (IE); Florin Nanu, Bucharest (RO)

(73) Assignee: Tessera Technologies Ireland Limited, Galway (IE)

( * ) Notice: Subject to any disclaimer, the term of this patent is extended or adjusted under 35 U.S.C. 154(b) by 1 day.

This patent is subject to a terminal disclaimer.

(21) Appl. No.: 12/543,405

(22) Filed: Aug. 18, 2009

(65) Prior Publication Data

US 2009/0304278 A1 Dec. 10, 2009

Related U.S. Application Data

(63) Continuation of application No. 11/233,513, filed on Sep. 21, 2005, now Pat. No. 7,587,085, which is a continuation-in-part of application No. 11/182,718, filed on Jul. 15, 2005, now abandoned, which is a continuation-in-part of application No. 11/123,971, filed on May 6, 2005, now Pat. No. 7,436,998, which is a continuation-in-part of application No. 10/976,336, filed on Oct. 28, 2004, now Pat. No. 7,536,036.

(51) Int. Cl.
*G06K 9/00* (2006.01)

(52) U.S. Cl. .................. 382/117; 382/103; 382/165

(58) Field of Classification Search .................. 382/117, 382/118, 167, 103, 164, 299, 165, 284; 348/239, 348/246
See application file for complete search history.

(56) References Cited

U.S. PATENT DOCUMENTS 7,587,085 B2 * 9/2009 Steinberg et al. ............. 382/167
2002/0150292 A1 10/2002 O'Callaghan
(Continued)

FOREIGN PATENT DOCUMENTS

JP 3205989 A2 9/1991
(Continued)

OTHER PUBLICATIONS

Final Office Action mailed Apr. 26, 2010, for U.S. Appl. No. 10/773,092, filed Feb. 4, 2004.

(Continued)

*Primary Examiner* — Anh Hong Do
(74) *Attorney, Agent, or Firm* — Andrew V. Smith

(57) ABSTRACT

A method for red-eye detection in an acquired digital image comprises acquiring a first image and analyzing the first acquired image to provide a plurality of characteristics indicative of image quality. The process then determines if one or more corrective processes can be beneficially applied to the first acquired image according to the characteristics. Any such corrective processes are then applied to the first acquired image. Red-eye defects are then detected in a second acquired image using the corrected first acquired image. Defect detection can comprise applying a chain of one or more red-eye filters to the first acquired image. In this case, prior to the detecting step, it is determined if the red-eye filter chain can be adapted in accordance with the plurality of characteristics; and the red-eye filter is adapted accordingly.

36 Claims, 12 Drawing Sheets

U.S. PATENT DOCUMENTS

2004/0041924 A1 3/2004 White et al.

FOREIGN PATENT DOCUMENTS

JP 7281285 A 10/1995

OTHER PUBLICATIONS

Final Office Action mailed Apr. 26, 2010, for U.S. Appl. No. 11/690,834, filed Mar. 25, 2007.

Final Office Action mailed Apr. 26, 2010, for U.S. Appl. No. 11/772,427, filed Feb. 2, 2007.

Final Office Action mailed Apr. 26, 2010, for U.S. Appl. No. 12/035,416, filed Feb. 21, 2008.

Final Office Action mailed Mar. 24, 2010, for U.S. Appl. No. 11/462,035, filed Aug. 2, 2006.

Non-Final Office Action mailed May 3, 2010, for U.S. Appl. No. 12/187,763, filed Aug. 7, 2008.

Non-Final Office Action mailed May 4, 2010, for U.S. Appl. No. 12/192,335, filed Aug. 15, 2008.

Notice of Allowance mailed Feb. 1, 2010, for U.S. Appl. No. 10/919,226, filed Aug. 16, 2004.

Notice of Allowance mailed Feb. 19, 2010, for U.S. Appl. No. 12/119,614, filed May 13, 2008.

Notice of Allowance mailed Feb. 19, 2010, for U.S. Appl. No. 12/194,148, filed Aug. 19, 2008.

Tatsutoshi Kitajima (JP04-192681 English Translation; Electronic Camera, Jul. 10, 1992).

* cited by examiner

Figure 5(a)
Figure 5(b)
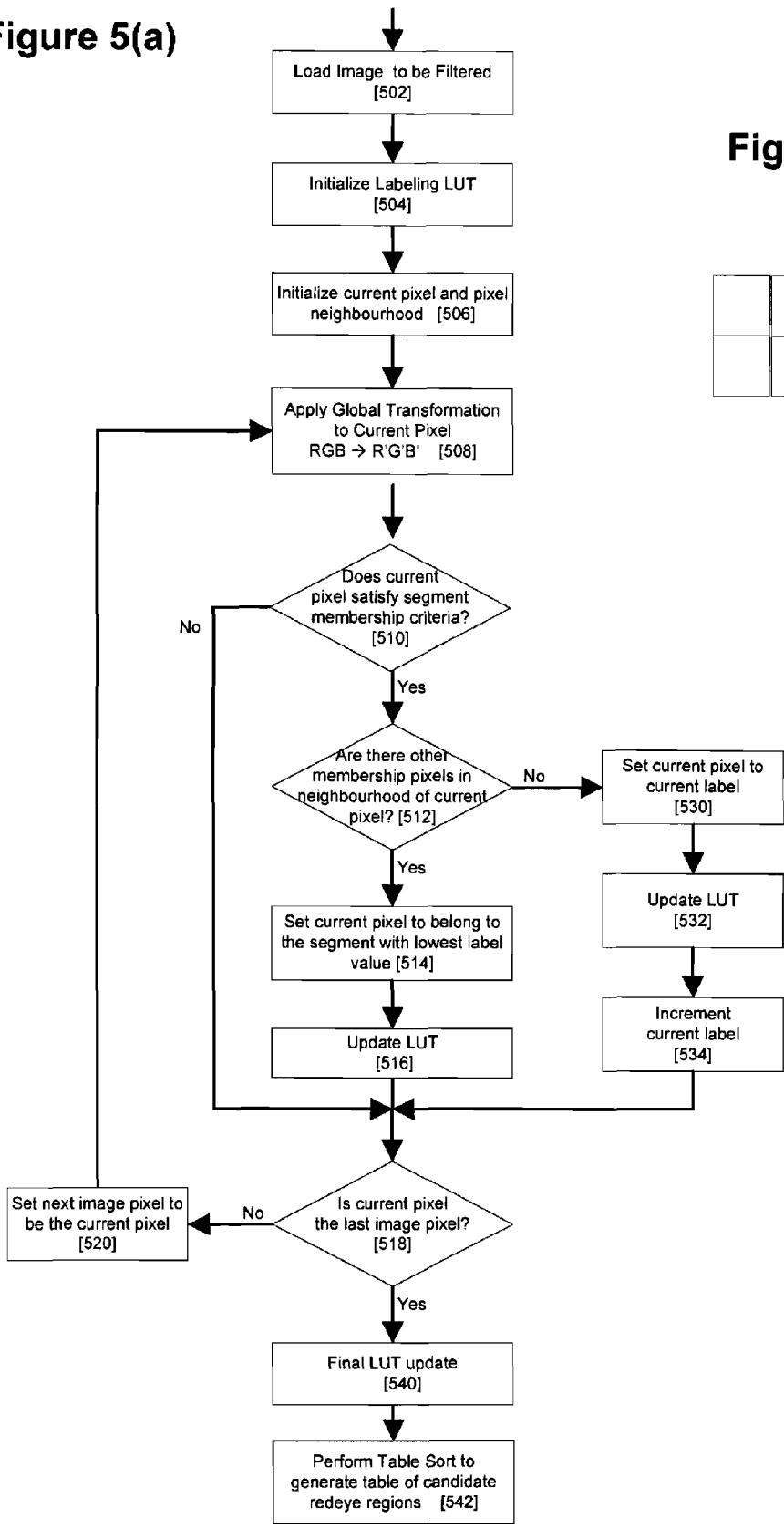
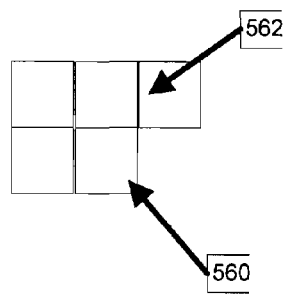

METHOD AND APPARATUS FOR RED-EYE DETECTION IN AN ACQUIRED DIGITAL IMAGE

PRIORITY

This application is a continuation of Ser. No. 11/233,513, filed Sep. 21, 2005, now U.S. Pat. No. 7,587,085, which is a continuation-in-part (CIP) which claims the benefit of priority to U.S. patent application Ser. No. 11/182,718, filed Jul. 15, 2005, now Abandoned, which is a CIP of U.S. application Ser. No. 11/123,971, filed May 6, 2005 now U.S. Pat. No. 7,436,998, and which is a CIP of U.S. application Ser No. 10/976,336, filed Oct. 28, 2004, now U.S. Pat. No. 7,536,036, each of these application being hereby incorporated by reference.

FIELD OF THE INVENTION

The present invention relates to digital image processing, and more particularly to a method and apparatus for red-eye detection in an acquired digital image.

BACKGROUND TO THE INVENTION

Red-eye is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

Digital cameras are becoming more popular and smaller in size. U.S. Pat. No. 6,407,777 to DeLuca describes a method and apparatus where a red eye filter is digitally implemented in the capture device. The success or failure of such filter relies on the quality of the detection and correction process.

Most algorithms that involve image analysis and classification, are statistical in nature. There is therefore a need to develop tools which will improve the probability of successful detection, while reducing the probability of false detection, while maintaining optimal execution, especially in limited computational devices such as in digital cameras. In many cases knowledge of the image characteristics such as image quality may affect the design parameters and decisions the detection and correction software needs to implement. For example an image with suboptimal exposure may deteriorate the overall detection of red-eye defects.

Thus, what is needed is a method of improving the success rate of algorithms for detecting and reducing red-eye phenomenon.

SUMMARY OF THE INVENTION

According to the present invention there is provided a method and apparatus for red-eye detection in an acquired digital image as claimed in the appended claims.

The present invention compensates for sub-optimally acquired images where degradations in the acquired image may affect the correct operation of redeye detection, prior to or in conjunction with applying the detection and correction stage.

The present invention improves the overall success rate and reduces the false positive rate of red eye detection and reduction by compensating for non-optimally acquired images by performing image analysis on the acquired image and determining and applying corrective image processing based on said image analysis prior to or in conjunction with applying one or many redeye detection filters to the acquired image. Such corrections or enhancements may include applying global or local color space conversion, exposure compensation, noise reduction, sharpening, blurring or tone reproduction transformations.

In preferred embodiments, image analysis is performed on a sub-sampled copy of the main acquired image where possible, enhancing the performance of this invention inside devices with limited computational capability such as hand held devices and in particular digital cameras or printers.

In the preferred embodiment, the pre-filtering process is optimized by applying, when possible, as determined from the image analysis, the image transformations at the pixel level during the redeye detection process thus compensating for non-optimally acquired images without requiring that corrective image processing be applied to the full resolution image.

In preferred embodiments, the redeye filter chain is configured for optimal performance based on image analysis of an acquired image to enhance the execution red eye detection and reduction process. Such configuration takes place in the form of variable parameters for the algorithm and variable ordering and selection of sub-filters in the process.

Preferred embodiments of the invention operate uniformly on both pixels which are members of a defect and its bounding region thus avoiding the need to determine individually if pixels in the neighborhood of said defect are members of the defect and to subsequently apply correcting algorithms to such pixels on an individual basis.

Using preferred embodiments of the present invention, variables that could significantly effect the success of the red-eye detection algorithm such as noise, color shifts, incorrect exposure, blur, over sharpening etc, may be pre-eliminated before performing the detection process, thus improving the success rate.

Alternatively or in addition these variables may be pre-accounted for by changing the parameters for the detection process, thus improving the performance and the success rate.

An advantage of preferred embodiments of the present invention is that by bringing images into a known and better defined image quality, the criteria for detection can be tightened and narrowed down, thus providing higher accuracy both in the positive detection and reduction in the false detection.

A further advantage of preferred embodiments of the present invention is that by accounting for the reasons for suboptimal image quality the parameters for the detection and correction algorithm may be modified, thus providing higher accuracy both in the positive detection and reduction in the false detection without the need to modify the image.

An additional advantage of preferred embodiments of this invention is that misclassification of pixels and regions belonging to defect areas is reduced if not altogether avoided, which means a reduction of undetected correct positives.

An additional advantage of preferred embodiments of this invention is that color misclassification of pixels and regions belonging to non-defect areas is reduced if not avoided, which means a reduction of false positives.

A further advantage of preferred embodiments of the present invention is that they can be implemented to run sufficiently fast and accurately to allow individual images in a batch to be analyzed and corrected in real-time prior to printing.

Yet a further advantage of preferred embodiments of the present invention is that they have a sufficiently low requirement for computing power and memory resources to allow it to be implemented inside digital cameras as part of the post-acquisition processing step.

Yet a further advantage of preferred embodiments of the present invention is that they have a sufficiently low requirement for computing power and memory resources to allow them to be implemented as a computer program on a hand-held personal digital assistant (PDA), mobile phone or other digital appliance suitable for picture display.

A further advantage of preferred embodiments of the present invention is that they are not limited in their detection of red-eye defects by requirements for clearly defined skin regions matching a human face.

A further advantage of this invention is the ability to concatenate image quality transformations and red eye detection to improve overall performance.

BRIEF DESCRIPTION OF THE DRAWINGS

FIGS. 5(a) and 5(b) illustrate the operation of a red-eye filter chain according to an embodiment of the present invention.

DETAILED DESCRIPTION OF THE INVENTION

Figure 1A:
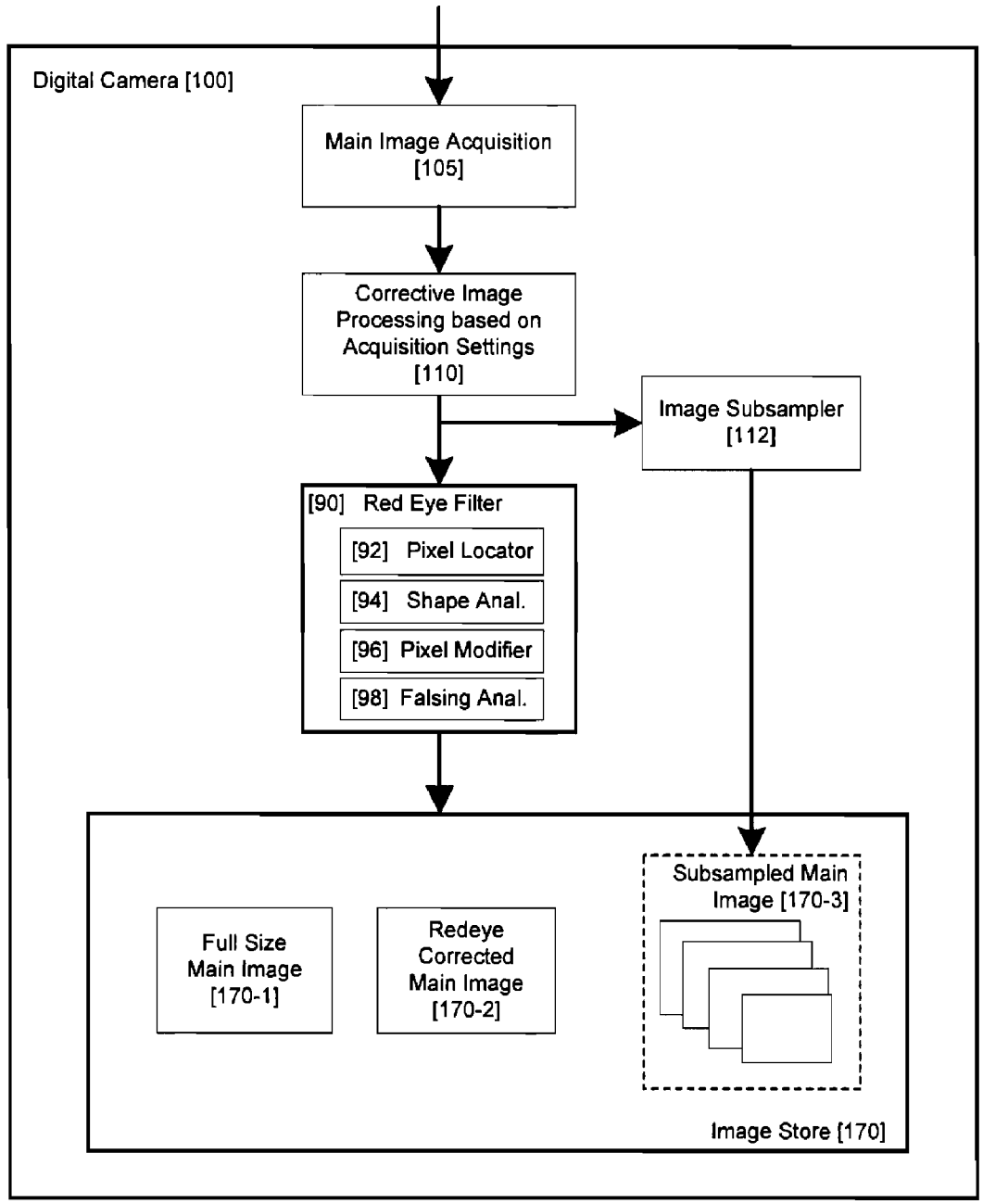
FIG. 1(a) shows a prior art in-camera redeye detection system.

FIG. 1 illustrates a prior art in-camera redeye system. Within the camera 100 a main image is acquired 105 from a sensor subsystem. This image is further processed 110 based on image acquisition parameters such as ambient lighting, length of exposure, usage of pre-flash and flash, lens focal length & aperture settings, etc. This image processing is pre-calibrated during the design of the camera and, due to the non-linear relationships between the various acquisition parameters, it typically involves a significant amount of empirical testing using as broad a range of image capture conditions as is practical. Thus, even though modern digital cameras have much improved auto-focus and auto-exposure algorithms it is still possible to capture images of non-optimal quality either through incorrect camera settings or through encountering conditions which are not fully accounted for by the empirical calibrations process for that camera.

After this image processing is completed the main acquired and processed image is normally committed to non-volatile storage in camera memory, or in an onboard storage card 170. However if the image was captured using a flash then the possibility of redeye defects implies that the image should first be passed through an in-camera redeye filter 90. A more detailed description of such a filter can be found in U.S. Pat. No. 6,407,777 to DeLuca herein incorporated by reference. Briefly it comprises of (i) a pixel locator filter 92 which detects candidate eye-defect pixels based on a color analysis and then groups said pixels into redeye candidate regions; (ii) a shape analyzer filter 94 which determines if a eye candidate region is acceptable in terms of geometry, size and compactness and further analyzes neighbouring features such as eyebrows and iris regions; and (iii) a falsing filter 98 which eliminates candidate regions based on a wide range of criteria. Any candidate regions which survive the falsing filter are then modified by a pixel modifier 96 and the corrected image 170-2 may then be stored in the main image store 170.

This prior art system typically will also feature a sub-sampler which can generate lower resolution versions 170-3 of the main acquired and processed image 170-1. This sub-sampling unit may be implemented in either software or may be hardware based and is, primarily, incorporated in modern digital cameras to facilitate the generation of thumbnail images for the main camera display.

Figure 1B:
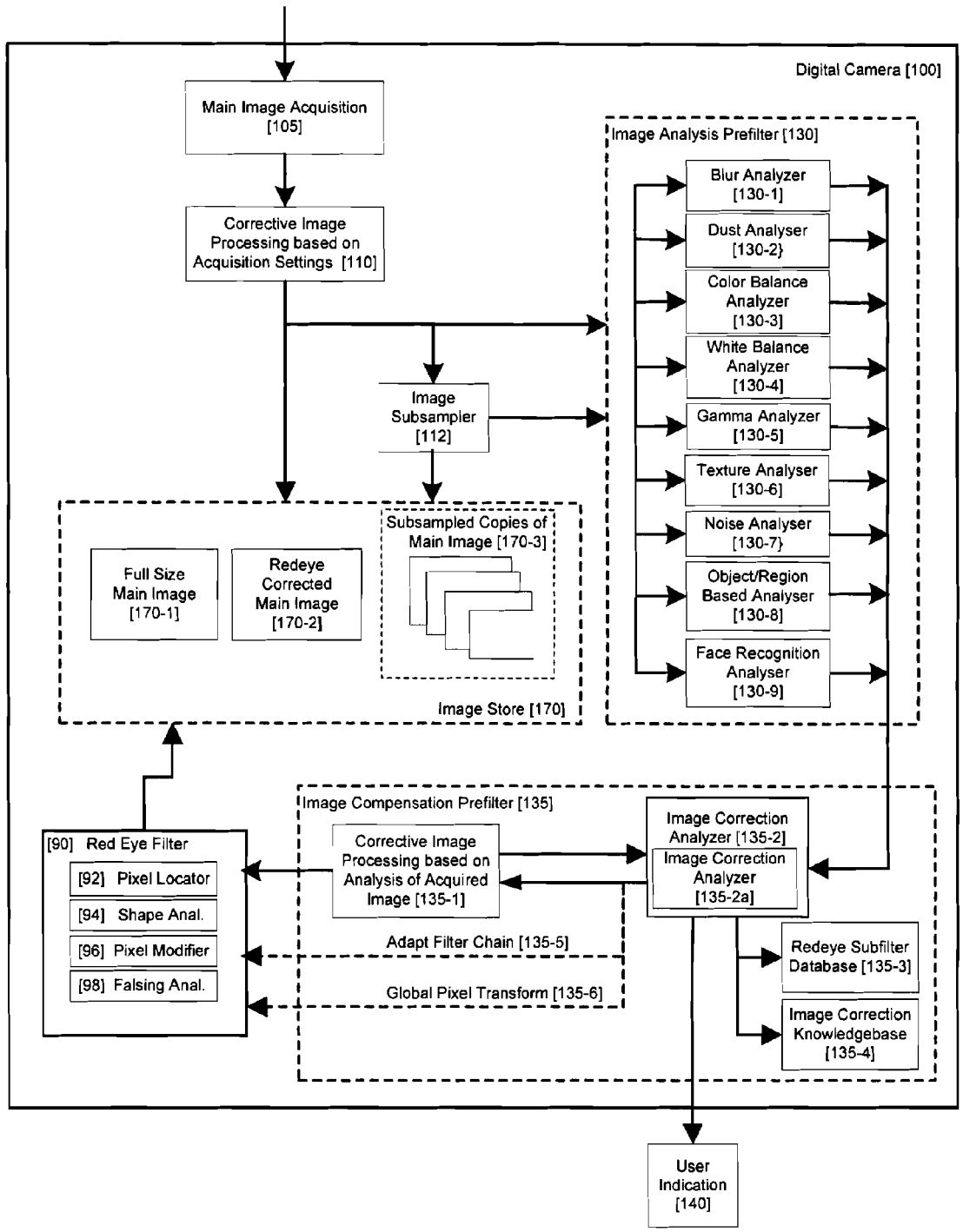
FIG. 1(b) shows an improved redeye detection system according to an embodiment of the present invention.

FIG. 1(b) illustrates a preferred embodiment of red-eye detection system according to the present invention. The system improves on the prior art by providing an additional image analysis prefilter 130 and an image compensation prefilter 135 to the prior art imaging chain to reduce the overall incidence of errors in the redeye detection process 90 for non-optimally acquired images.

The image analysis prefilter 130 combines one or more techniques for determining image quality. Such techniques are well known to one familiar in the art of image processing and in particular image editing and enhancements. Thus, the prefilter provides an in-camera analysis of a number of characteristics of an acquired, processed image with a view to determining if these characteristics lie within acceptable limits. It will be clear to those skilled in the art that the exact combination of analysis techniques will be dependent on the characteristics of the non-optimally acquired images generated by a particular digital camera. In addition, the determination of what image quality matters need to be addressed is primarily dependent on the effect of such characteristics on the red eye filter 90. Thus, as illustrative examples:

(i) a low-end digital camera may omit complex noise filtering circuitry on its sensor as it is targeted at cost-sensitive markets and may employ low quality optics for similar reasons. Thus it may be susceptible to a greater degree of image noise and exhibit a poor dynamic range for white and color balance;

(ii) a high-end professional camera will have a much greater dynamic range for color and white balance but may require more sophisticated image analysis to compensate for motion blur, sensor dust and other image distortions that are of concern to professional photographers.

Accordingly we shall provide some examples of image analysis techniques for exemplary purposes only and it will be understood these are not intended to limit the techniques which may be utilized in implementing the present invention.

One subsystem of the image analysis prefilter is a blur analyzer 130-1, which performs an image analysis to determine blurred regions within a digital image—this operate on either the full size main image 170-1 or one or more subsampled copies of the image 170-3. One technique for in-camera blur detection is outlined in US patent application 2004/0120598 to Feng which describes a computationally efficient means to determine blur by analysis of DCT coefficients in a JPEG image. In common with the other subsystems of the prefilter 130, the analyser provides a measure of the blur in the supplied image(s) to be used later in the prefilter 135. This measure could be as simple as an index between 0 and 1 indicating the degree of blur. However, it could also indicate which regions of the image are blurred and the extent to which these are blurred.

A further subsystem of the image analysis prefilter is a dust analyzer 130-2. The problems caused by dust on imaging devices are well known in the prior art. In the context of the present invention it is important to track the location and severity of dust particles as these may interfere with the correct detection of eye-defects when the two forms of defect overlap. Of particular relevance are techniques where the detection of defects in a digital image is based solely on analysis of the digital image and that do not directly relate to the image acquisition process. For example U.S. Pat. No. 6,233,364 to Krainiouk et al. discloses determining anomalous image regions based on the difference between the gradient of an image at a set of grid points and the local mean of the image gradient. This technique generates few false positives in "noisy" regions of an image such as those representing leaves in a tree, or pebbles on a beach. U.S. Pat. No. 6,125,213 to Morimoto discloses detecting potential defect or "trash" regions within an image based on a comparison of the quadratic differential value of a pixel with a pre-determined threshold value. In addition, Morimoto discloses correcting "trash" regions within an image by successively interpolating from the outside of the "trash" region to the inside of this region—although this does not need to be performed by the subsystem 130-2. U.S. Pat. No. 6,266,054 to Lawton et al. discloses automating the removal of narrow elongated distortions from a digital image utilizing the characteristics of image regions bordering the distortion. US patent application 2003/0039402 and WIPO patent application WO-03/019473 both to Robins et al. disclose detecting defective pixels by applying a median filter to an image and subtracting the result from the original image to obtain a difference image. This is used to construct at least one defect map and as such provide a measure of the effect of dust on an image supplied to the subsystem 130-2.

U.S. Pat. No. 6,035,072 to Read discloses mapping defects or dirt, which affect an image acquisition device. A plurality of images are processed and stationary components which are common between images are detected and assigned a high probability of being a defect. Additional techniques which are employed to modify defect probability include median filtering, sample area detection and dynamic adjustment of scores. This dynamic defect detection process allows defect compensation, defect correction and alerting an operator of the likelihood of defects, but from the point of view of the preferred embodiment, it is the map which is produced which indicates to the prefilter 135 the degree to which the supplied images are affected by dust and/or defects.

Additional subsystems of the image analysis prefilter are a white balance analyzer 130-3, a color balance analyzer 130-4, and a gamma/luminance analyzer 130-5. In the embodiment, each of these provides, for example, an indicator of the degree to which each of these characteristics deviates from optimal and by which the supplied image might be corrected. Those skilled in the art will realize that such techniques are practiced in a digital camera as part of corrective image processing based on acquisition settings 110. Prior art techniques which can be employed in embodiments of the present invention also exist for post-processing of an acquired image to enhance its appearance. Some representative examples are now described:

U.S. Pat. No. 6,249,315 to Holm teaches how a spatially blurred and sub-sampled version of an original image can be used to obtain statistical characteristics of a scene or original image. In Holm, this information is combined with the tone reproduction curves and other characteristics of an output device or media to provide an enhancement strategy for digital images, whereas in the preferred embodiment, an analysis prefilter employing the technique of Holm preferably provides the color characteristics of the supplied image to the prefilter 135.

U.S. Pat. No. 6,268,939 to Klassen et al. teaches correcting luminance and chrominance data in digital color images. Specifically, Klassen is concerned with optimizing the transformations between device dependent and device independent color spaces by applying subsampling of the luminance and chrominance data.

U.S. Pat. No. 6,192,149 to Eschback et al. discloses improving the quality of a printed image by automatically determining the image gamma and then adjusting the gamma of a printer to correspond to that of the image. Although Eschback is concerned with enhancing the printed quality of a digital image and not the digital image itself, if does teach a means for automatically determining the gamma of a digital image and as such can be used in an analysis pre-filter in embodiments of the present invention. U.S. Pat. No. 6,101,271 to Yamashita et al. discloses implementing a gradation correction to an RGB image signal which allows image brightness to be adjusted without affecting the image hue and saturation.

A further subsystem of the image analysis prefilter is an image texture analyzer 130-6 which allows texture information to be gathered from the acquired and processed main image. This information can be useful both in determining different regions within an image and, when combined with information derived from other image analysis filters such as the blur analyzer 130-1 or a noise analyzer 130-7 it can enable automatically enhancement of an image by applying deblurring or denoising techniques. US patent application 2002/0051571 to Jackway et al discloses texture analysis for digital images. US patent application 2002/0090133 to Kim et al discloses measuring color-texture distances within a digital images and thus offering improved segmentation for regions within digital images.

A further subsystem of the image analysis prefilter is the noise analyzer 130-7 which produces a measure of the effect of noise on the image supplied to the subsystem 130-7. A further illustrative subsystem of the image analysis prefilter 130 is an object/region analyzer 130-8 which allows localized analysis of image regions. One particular region which will invariably be found in an image with eye-defects is a human face region. The detection of a face region in an image with eye-defects is simplified as described in US patent application 2004/0119851 to Kaku. Again, an analysis pre-filter employing Kaku would therefore provide indicators of where faces regions are to be found in a supplied image to the pre-filter 135.

The last illustrative subsystem of the image analysis prefilter 130 is a face recognition analyzer 130-9 which includes a database of pre-determined data obtained from training performed on a personal image collection (not shown) loaded onto the digital camera in order to recognize a person associated with a determined region preferably acquired by the analyzer 130-8 and to provide an indicator of the person or person(s) whose faces have been recognized in an image. Alternatively, the face recognition analyzer 130-9 may provide an indicator of the types of any faces recognized in the image provided to the pre-filter 130-9, for example, a child or adult face, or African, Asian or Caucasian face.

In one embodiment, the analyser 130-9 comprises a set of classifiers which enable multiple sets of face (and/or non-face) data to be combined to provide improved recognition of persons found in an image. The types of classifiers used can be based on skin color, age characteristics, eye-shape and/or eye-brow thickness, the person's hair and/or clothing, poses associated with a person and/or whether or not a person may be wearing makeup, such as eye-shadow or lipstick, or glasses, as preferably obtained from the training performed on the personal image collection.

One particular advantage of employing a face recognition analyzer 130-9 as an element of the image analysis prefilter is that it enables additional image processing modules to perform face and peripheral region analysis which will enable a determination of known persons within an image. A more detailed description of the preferred person recognizer 135-2a is provided in co-pending application Ser. No. 11/027,001, filed Dec. 29, 2004, and hereby incorporated by reference. For the person recognizer 135-2a to function more effectively an additional database component containing classifier signatures associated with known persons is preferably included. This database will typically be derived from a personal collection of images maintained by the owner of a digital camera and, in most typical embodiments, these will be stored off-camera. Further details on the creation and management of exemplary embodiments of such image collections and associated off-camera and in-camera databases is given in co-pending application Ser. No. 10/764,339, filed Jan. 22, 2004 and Ser. No. 11/027,001, filed Dec. 29, 2004 which are hereby incorporated by reference.

The image analysis prefilter may also incorporate a module to separate background and foreground regions of an image (not shown). Such a module is described in co-pending application entitled "Foreground/Background Segmentation in Digital Images With Differential Exposure Calculations, serial number not yet assigned (FN-122), filed Aug. 30, 2005, hereby incorporated by reference, and may be advantageously employed to reduce the area of an image to which a redeye filter is applied, thus speeding up the execution time. In such a case the image is not necessarily corrected, or the filter chain is not necessarily adapted but the method of application of the filter chain to the image is altered.

Turning now to the image compensation prefilter 135. In the present embodiment, a combination of image correction analyzer 135-2 and a redeye subfilter database 135-3
  (i) interpret the results of the image analysis performed by the image analysis prefilter 130;
  (ii) if corrective image processing is active, determine an optimal correction strategy for application to the acquired, processed image, or a subsampled copy thereof;
  (iii) if adaption of the redeye filter chain is implemented, determine any parameter/filter conflicts and further determines an optimal adaption of the redeye filter chain (described later); and
  (iv) if both corrective image processing and filter adaption are active, determine an optimal combination of each.

For example, if the analyzer 130-9 has recognised one or more persons or types of persons in an image, a customized redeye filter set stored as a set of rules in the database 135-3 may be applied to the image. To understand how such customization can improve the performance of a redeye filter we cite some examples of known aspects of the redeye phenomenon which are person specific.

For example, children and babies are particularly susceptible to redeye. They are also more prone to certain types of redeye, e.g. "bright-eye" where the eye is almost completely white with only a reddish periphery, which can be often more difficult to analyze and correct.

In addition, racial or ethnic characteristics can cause differences in the color characteristics of the redeye phenomenon. For example, Asian people often exhibit a dull reddish or even "brownish" form of redeye while persons of Indian descent often exhibit redeye effects with a distinctly "purplish" hue. The extent of these characteristics may vary somewhat from individual to individual.

As such, knowledge of the type of person in an image can be used by the analyzer 135-2 to determine the filters, the order of the filters and/or the filter parameters to be applied to an image. For example, the filter parameters may be changed on the basis of skin color in that a distinctive set of prototype values could be available for each person; or age characteristics, to enable a higher tolerance of certain color and/or luminance-based filters; eye-shape and/or eye-brow thickness which are person specific; and/or whether or not a person is wearing glasses, which can introduce strong glints resulting in detection errors for standard filter sets. Similarly, the filter order may be changed depending on the 'identity' of the person in the image, i.e. whether or not the person is wearing makeup and/or glasses. For example, if a person is wearing eye shadow and/or lipstick, certain skin filters might not be applied. Instead, alternative filters could be used to determine a uniform color/texture in place of the normal skin filter.

The actual corrective image processing 135-1 will typically be implemented as a library of image processing algorithms which may be applied in a variety of sequences and combinations to be determined by the image correction analyzer 135-2. In many digital cameras some of these algorithms will have partial or full hardware support thus improving the performance of the compensation prefilter 135.

It was already remarked that the analysis prefilter 130 can operate on a subsampled copy of the main image 170-3. In the same way the detection phase of the redeye filter 90 can be applied to a subsampled copy of the main image 170-3, although not necessarily of the same resolution. Thus where corrective image processing is used by the image compensation prefilter it will also be applied to a subsampled copy of the main image 170-3. This has significant benefits with respect to computation speed and computing resources, making it particularly advantageous for in-camera embodiments.

We also remark that the image correction analyzer 135-2 may not always be able to determine an optimal correction strategy for an acquired, processed image due to conflicts between image processing algorithms, or between the filter adaptions required for the redeye filter chain. In other instances, where a strategy can be determined but the image correction analyzer 135-2 may be aware that the strategy is marginal and may not improve image quality it may be desirable to obtain user input. Thus the image correction analyzer 135-2 may generate a user indication 140 and in certain embodiments may also employ additional user interaction to assist in the image correction and redeye filter processes.

FIG. 2a to FIG. 2e illustrate several alternative embodiments of the present invention which are described as follows:
  (i) In FIG. 2(a) an acquired, processed main image, or alternatively a subsampled copy thereof, is initially loaded, step 201 to respective sub-systems of the analysis prefilter 130, step 202. These produce their measurements and a determination is made if any of the image quality characteristics lie within or outside acceptable thresholds is made by the image correction analyser 135-2, step 204. If image quality is within acceptable limits for each of the image characteristics analyzed then the redeye filter 90 can be applied normally and no corrective image processing is required. However, if certain image characteristics do lie outside acceptable tolerances then additional analysis is performed by the analyser 135-2 to determine if corrective image processing can be applied 206. If some of the analyzed image characteristics lie too far outside acceptable thresholds, or if a disadvantageous combination of image characteristics is determined, it may not be possible to correct the image reliably prior to applying the redeye filter. Thus the filter 90 can be disabled 220, a user indication 140 can be provided and processing is completed for this particular image 224, without performing the red eye correction or performing the process with lower probability of success. However, if the image can be repaired, 206-YES, the image is corrected step 208, prior to executing the red eye algorithm 90. In the preferred embodiment, the process of correcting the image, 208 may be performed on the full resolution image, or alternatively on a subsampled image or a copy of the image. The exact nature and possibilities for such corrections, 208, whether locally or globally are described later. In any case, the corrected image needs only be stored temporarily and can be discarded after red-eye processing is complete, 209. It should be noted that performing the pre-filtering, 208 on the image, does not means that the actual red-eye detection and reduction algorithm, 90 has to be modified to account for possible variability. Nonetheless, as image quality supplied to the filter 90 is improved, the red eye algorithm can use tighter parameters and more well defined restrictions as to the nature of the red eye features that are to be identified so producing improved results.

Figure 2A:
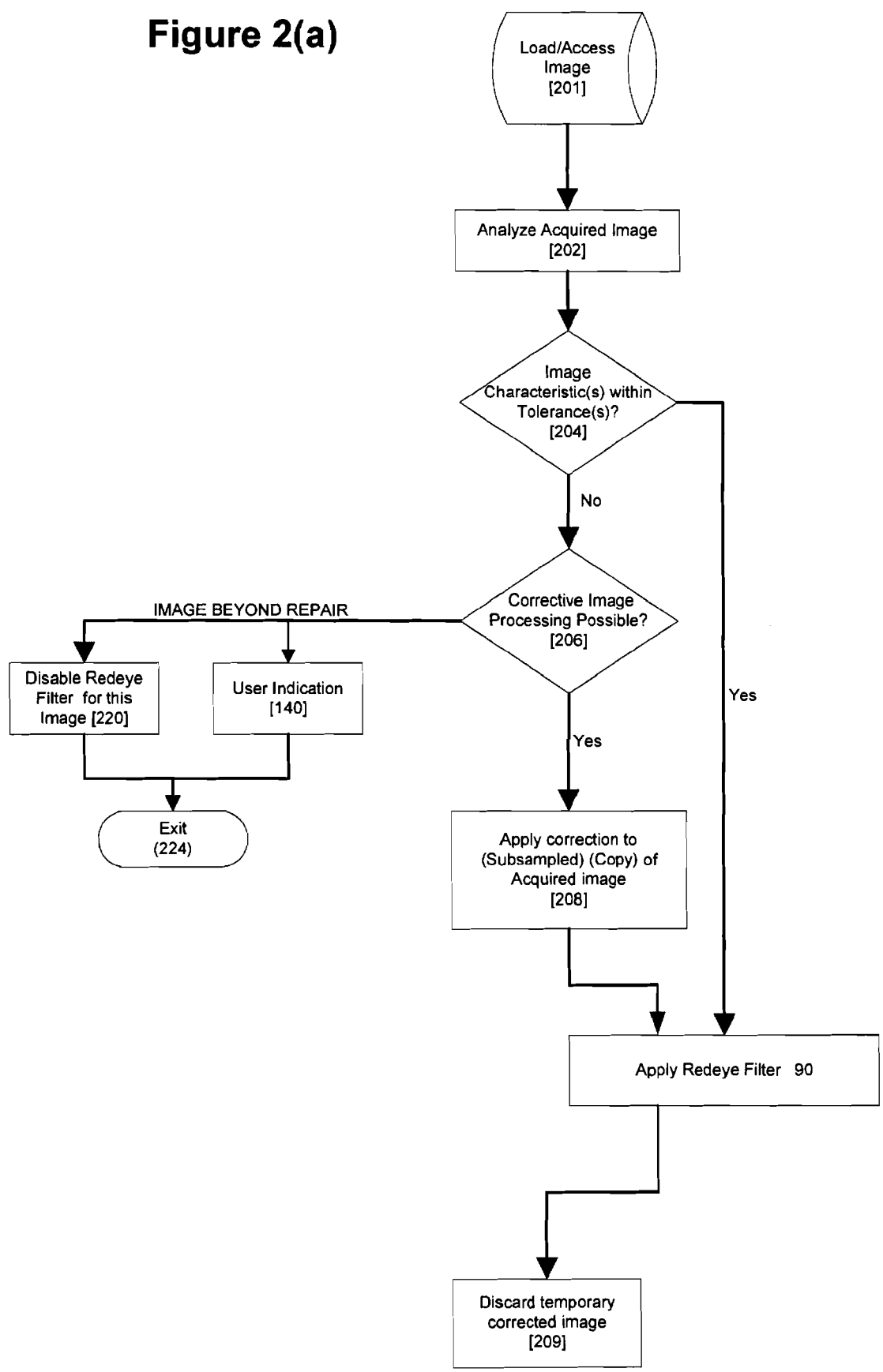
FIG. 2(a) is a flowchart illustrating the operation of the system of FIG. 1(b)
Figure 2B:
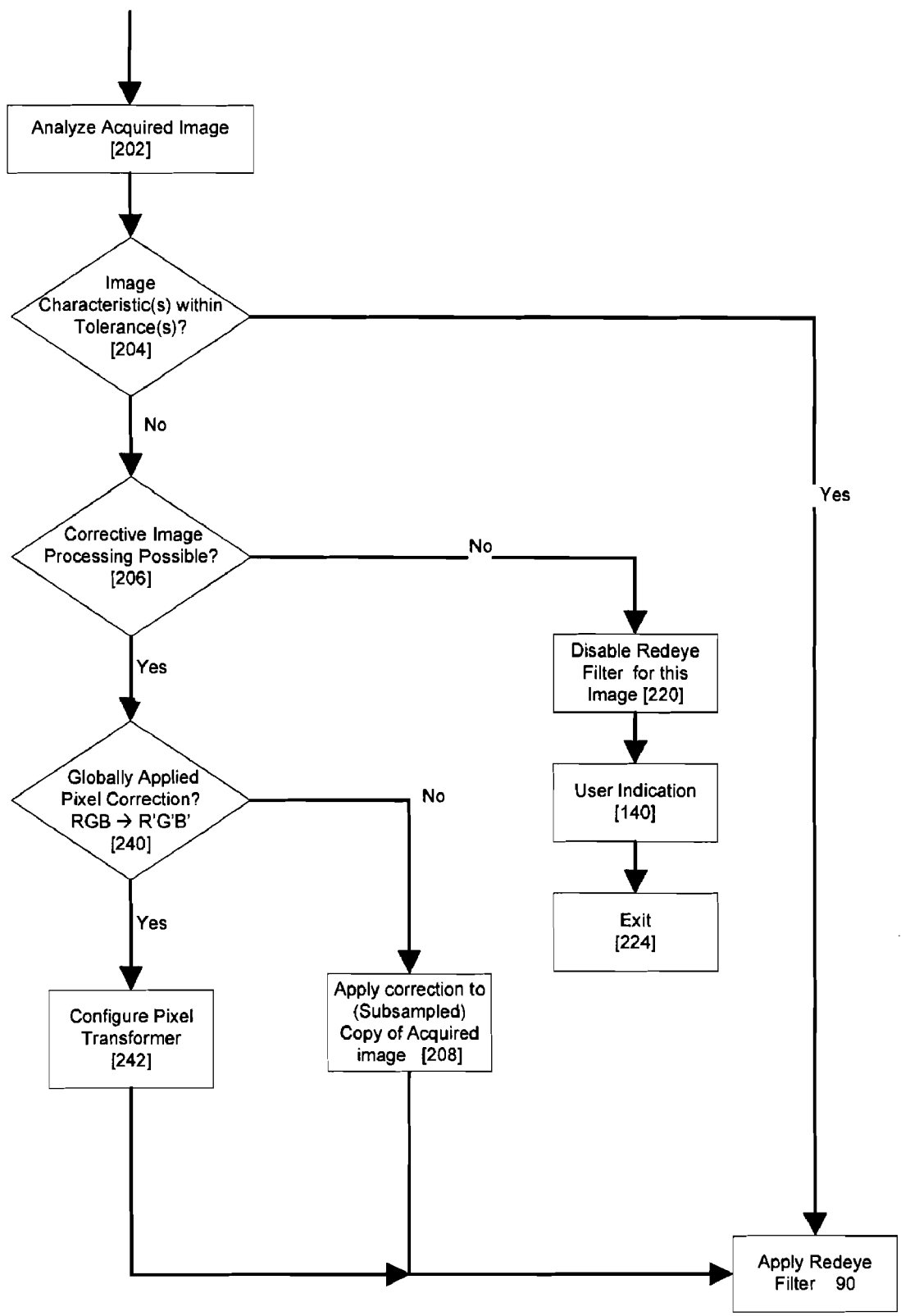
FIG. 2(b) is a flowchart illustrating an alternative mode of operation of the system of FIG. 1(b)

(ii) FIG. 2(b) corresponds with FIG. 2(a) except that it includes an additional determining step, 240 which follows the determination that corrective image processing is possible, 206. This additional step determines if the corrective image processing to be applied to the image can be provided by a globally applied transformation of the image pixels. The most popular global transformations are matrix multiplication or lookup table transformations. For example, the analysis provided by filters 130-3 . . . 130-5 may indicate to the analyser 135-2 that the principle cause of image non-optimality is a reddish color cast. In this case, a simple transformation of the red image component, R-->R' is sufficient to compensate for the image non-optimality. Another example will be an image that is under exposed and a tone reproduction curve (TRC) needs to be corrected. Global transformations have the advantage of being relatively computationally efficient and with a potential to be highly optimized. In addition, such transformations may be performed within the redeye filter 90 itself, for example, as part of the pixel locator and region segmentation process 92 described in more detail later in relation to FIGS. 3 and 5, so reducing the overhead involved in performing this correction. For the moment, it is sufficient to say that in step 242, a pixel transformation within the pixel locator and region segmentor 92 of the red-eye filter is configured. It will also been seen that the steps 240, 242 may be performed as an alternative to other corrections step 208, in parallel with other corrections or in series with other corrections prior to execution of the red-eye filter 90.

Figure 2C:
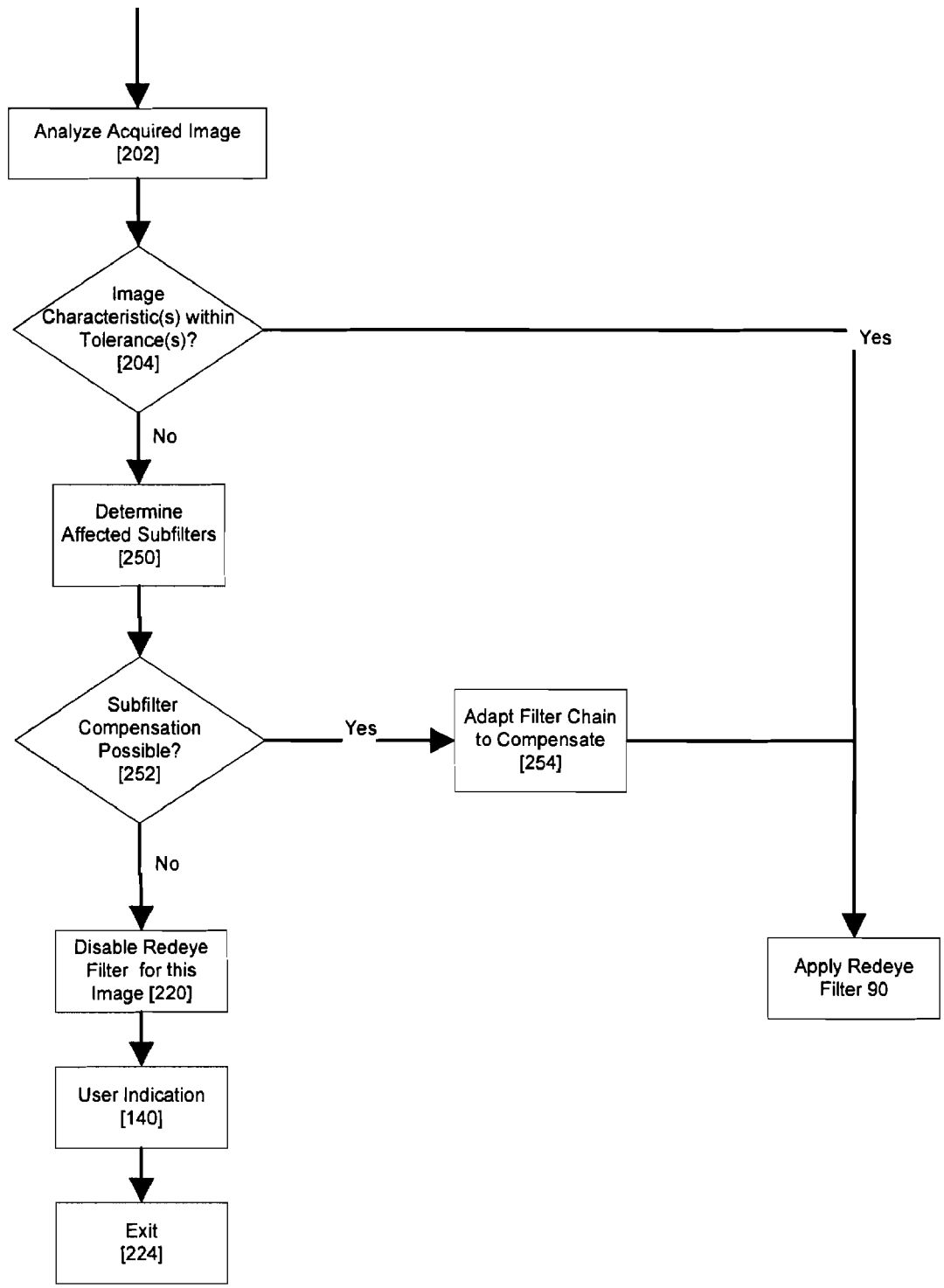
FIG. 2(c) illustrates another alternative mode of operation of the system of FIG. 1(b)

(iii) In FIG. 2(c) instead of corrective image processing to compensate for a non-optimally acquired image, the analyser 135-2 adapts the redeye filter chain to provide image compensation for the redeye detection process. Steps 202 and 204 are identical with previous embodiments. However, when an image characteristic lies outside acceptable tolerances, the analyser 135-2 determines the redeye subfilters affected by said out-of-tolerance image characteristic, step 250. Typically this determining step will involve the image correction analyzer 135-2 obtaining the relevant data from an in-camera data repository such as the redeye subfilter database 135-3. After the affected subfilters have been determined 250, the next step is to determine if subfilter compensation is possible 252. This will depend on the different image characteristics which are outside acceptable thresholds and the relevant sets of redeye subfilters affected by each out-of-tolerance image characteristic. If filter chain adaption is possible then the filter chain is modified 254 and the redeye filter is applied 90. If subfilter compensation is not possible due to filter, or parameter-based conflicts then steps 220, 140, and 224 are performed as in the previous embodiments. The subfilter determining process is further described in FIG. 4(b) and an overview of the redeye subfilter matrix is given in FIG. 3.

The following example illustrates the concept of applying the results of the analysis stage to modify the filter chain of the correction process and the red eye detection process as opposed to modification of the image pixels. It is assumed that a pixel $\{R_0,G_0,B_0\}$ after the needed correction, step 208, is transformed to pixel value $\{R_1,G_1,B_1\}$ by a transformation T: $T[\{R_0,G_0,B_0\}]=\{R_1,G_1,B_1,\}$ For illustrative purposes, we assume that the first stage of the red eye detection algorithm, as defined in block 92 of FIG. 1(a) is comparison to a known value, to determine if the pixel is, in simplified terms, red or not. The value of the pixel in to compare with is $\{R',G',B'\}$. However, the two steps above of correcting and comparing may be combined simply by transforming the static value of $\{R',G',B'\}$ based on the inverse of the correction transformation. Thus, the preliminary preparatory stage will be: $\{R'',G'',B''\}=T^{-1}[\{R',G',B'\}]$ and the pixel by pixel comparison, as adapted, step 254 to the necessary needed transformations will comprise the following test: IF $\{R_0,G_0,B_0\} \geqq \{R'',G'',B''\}$ By doing so, the entire image is not corrected, but the comparison is similar to the state as if the image was corrected. The complexity and number of necessary steps compared to the original algorithm is exactly the same, with the extra value that the image algorithm now is taking into account the sub-optimal quality of the image.

Mathematically speaking:

$$T[\{R_0,G_0,B_0\}]\alpha\{R',G',B'\}=\{R_0,G_0,B_0\}\alpha T^{-1}[\{R',G',B'\}]=\{R_0,G_0,B_0\}\alpha\{R'',G'',B''\}$$

Where α denotes the relationship between the objects.

Of course, such adaptation may be more complex than the simplified example above, and may include change of multiple values in the algorithm or change in the order the various filters are applied, or change in the weight of the various filters. However, the improvement in performance may justify the added architectural complexity.

Figure 2D:
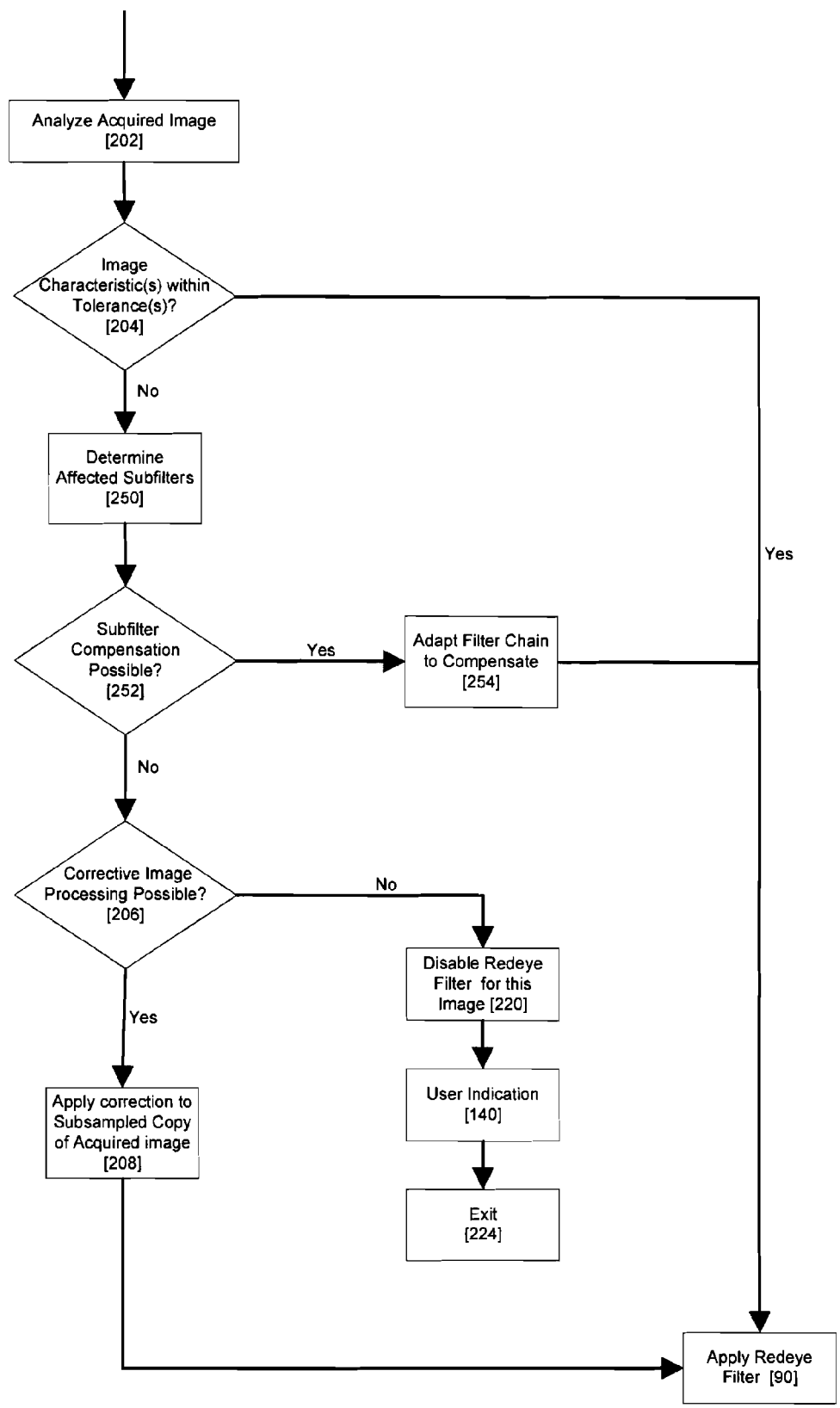
FIG. 2(d) is a flowchart illustrating a further alternative mode of operation of the system of FIG. 1(b)

(iv) FIG. 2(d) illustrates a combination of the embodiments described in 2(b) and 2(c). This embodiment is identical to the previous embodiments except that if subfilter compensation is not possible 252 it incorporates two additional steps to determining if corrective image processing can be applied 206 and if this is possible a second step 208 to apply said corrective image processing. Note that subfilter adaption is preferred to corrective image processing as it requires practically no computational resources, but only changes the input parameters of the subfilters which comprise the redeye filter chain and the composition and order-of-execution of the chain itself. However in certain circumstances correction of the original acquired image by image processing means may provide more reliable redeye detection, or be desirable as an end in itself.

Figure 2E:
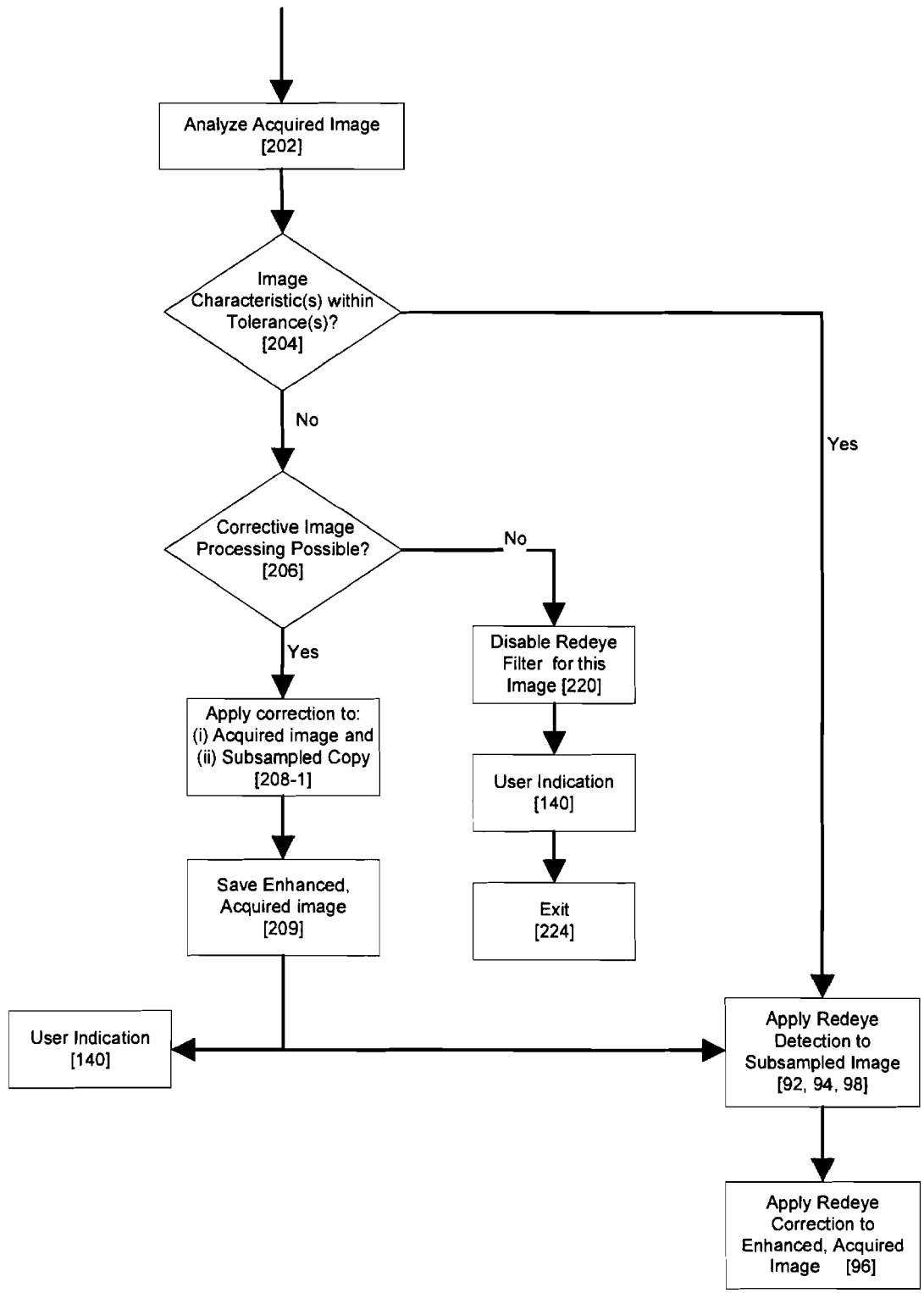
FIG. 2(e) is a flowchart illustrating a still further alternative mode of operation of the system of FIG. 1(b)

(v) FIG. 2(e) describes an alternative variation of the algorithm. This is identical to the embodiment of FIG. 2(a) except that after determining if corrective image processing is possible 206, corrective image processing is applied to both the main acquired image 170-1 and a subsampled copy 170-3 thereof, step 208-1. A second additional step then saves the corrected acquired image 170-2, in the main image store 170, step 209, and a user indication 140 is generated to inform the camera user that an improved image is available. Additional steps may be added to allow the user to select between original 170-1 and corrected images 170-2 if so desired. In this embodiment, redeye detection 92, 94, 98 is applied to the corrected subsampled copy of the main acquired image and the redeye correction 96 is applied to the corrected copy of the main acquired image. In other embodiments corrective image processing would not be applied to the full-sized main image 170-1 so that the redeye correction would be applied to the uncorrected main image.

Figure 3:
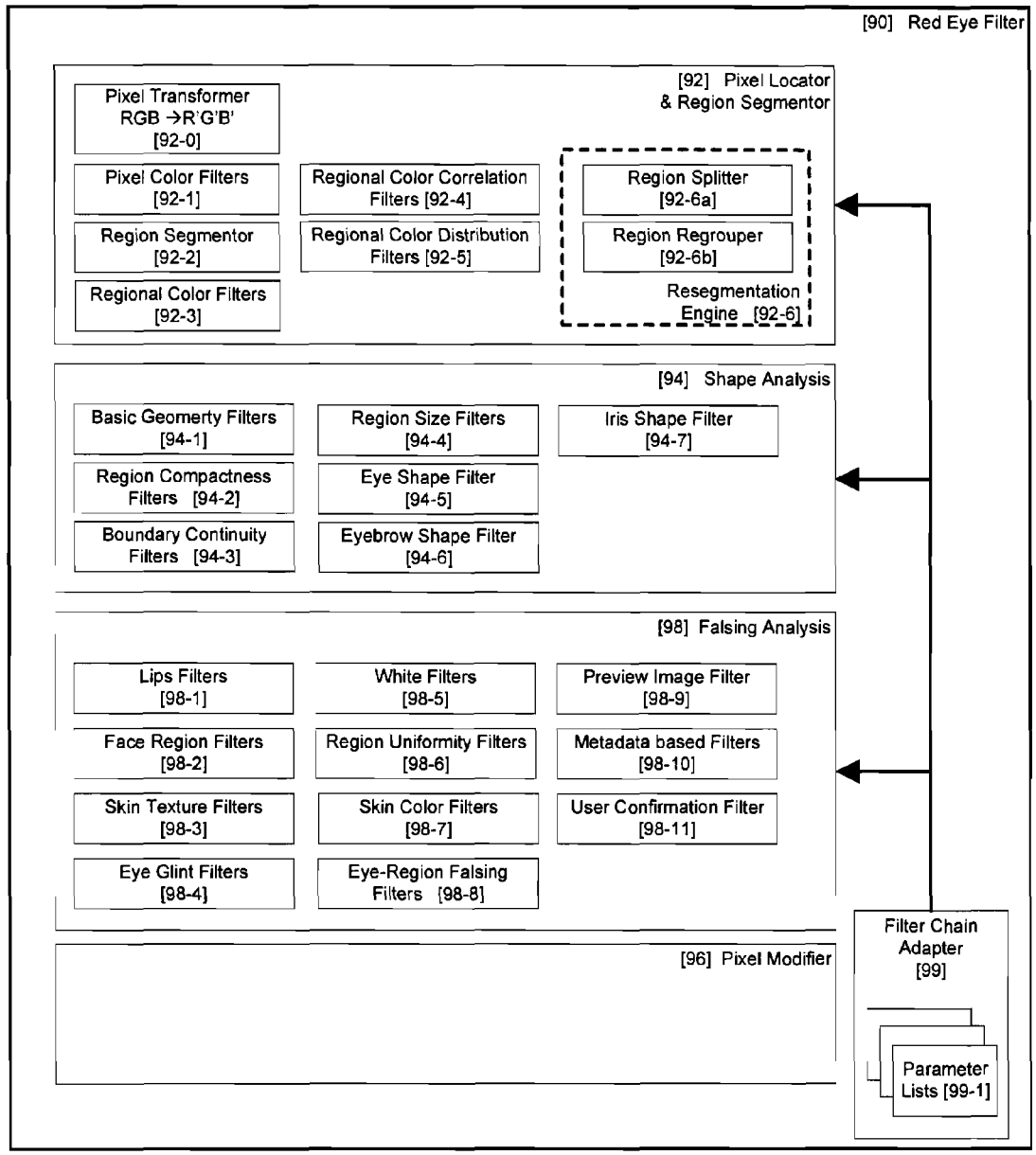
FIG. 3 shows the redeye filter chain of FIG. 1(b) in more detail.

FIG. 3 shows the principle subfilter categories which exist within the main redeye filter 90. While each of the component filters will be referred to in sequence, it will be appreciated that where appropriate more than one of these filters may be applied at a given time and the decisions above to modify the filter chain can include a decision not alone as to which filters may be executed in a sequence, but also on which filters can be applied in parallel sequences. As described above, the pixel transformer filter 92-0 allows global pixel-level transformations of images during color determining and pixel grouping operations. Also, within the pixel locator and region segmenter 92 we find pixel color filters 92-1 which perform the initial determining if a pixel has a color indicative of a flash eye defect; a region segmentor 92-2 which segments pixels into candidate redeye groupings; regional color filters 92-3, color correlation filters 92-4, and color distribution filters 92-5 which operate on candidate regions based these criteria. In addition the pixel locator and region segmenter 92 contains two additional functional blocks which do not contribute directly to the color determining and segmentation operations but are nevertheless intertwined with the operation of the pixel locator and region segmenter. The resegmentation engine 92-6 is a functional block which is particularly useful for analyzing difficult eye defects. It allows the splitting 92-6a and regrouping 92-6b of borderline candidate regions based on a variety of threshold criteria.

After candidate eye-defect groupings have been determined by the segmenter 92, a shape analyzer 94 next applies a set of subfilters to determine if a particular candidate grouping is physically compatible with known eye-defects. Thus some basic geometric filters are first applied 94-1 followed by additional filters to determine region compactness 94-2 and boundary continuity 94-3. Further determining is then performed based on region size 94-4, and a series of additional filters then determine if neighbouring features exist which are indicative of eye shape 94-5, eyebrows 94-6 and iris regions 94-7. In certain embodiments of the present invention the redeye filter may additionally use anthropometric data to assist in the accurate determining of such features.

Now the remaining candidate regions are passed to a falsing analyzer 98 which contains a range of subfilter groups which eliminate candidate regions based on a range of criteria including lips filters 98-1, face region filters 98-2, skin texture filters 98-3, eye-glint filters 98-4, white region filters 98-5, region uniformity filters 98-6, skin color filters 98-7, and eye-region falsing filters 98-8. Further to these standard filters a number of specialized filters may also be included as part of the falsing analyzer 98. In particular we mention a category of filter based on the use of acquired preview images 98-9 which can determine if a region was red prior to applying a flash. This particular filter may also be incorporated as part of the initial region determining process 92, as described in co-pending U.S. application Ser. No. 10/919,226 from August, 2004 entitled "Red-Eye Filter Method And Apparatus" herein incorporated by reference. An additional category of falsing filter employs image metadata determined from the camera acquisition process 98-10. This category of filter can be particularly advantageous when combined with anthropometric data as described in PCT Application No. PCT/EP2004/008706. Finally an additional category of filter is a user confirmation filter 98-11 which can be optionally used to request a final user input at the end of the detection process. This filter can be activated or disabled based on how sub-optimal the quality of an acquired image is.

The pixel modifier 96 is essentially concerned with the correction of confirmed redeye regions. Where an embodiment of the invention incorporates a face recognition module 130-9 then the pixel modifier may advantageously employ data from an in-camera known person database (not shown) to indicate aspects of the eye color of a person in the image. This can have great benefit as certain types of flash eye-defects in an image can destroy indications of original eye color.

In the preferred embodiment, an additional component of the redeye filter 90 is a filter chain adapter 99. This component is responsible for combining, and sequencing the subfilters of the redeye filter 90 and for activating each filter with a set of input parameters corresponding to the parameter list(s) 99-1 supplied from the image compensation prefilter 135.

Finally, it is remarked in the context of FIG. 3 that although the pixel locator & region segmenter 92, the shape analyzer 94 and the falsing analyzer 98 are illustrated as separate components it is not intended to exclude the possibility that subfilters from these components may be applied in out-of-order sequences. As an illustrative example, regions which pass all the falsing filters except for the region uniformity filter 98-6 may be returned to the resegmentation engine 92-6 to determine if the region was incorrectly segmented. Thus a subfilter from the pixel locator and region segmentor 92 may be used to add an additional capability to the falsing analysis 98.

Figure 4A:
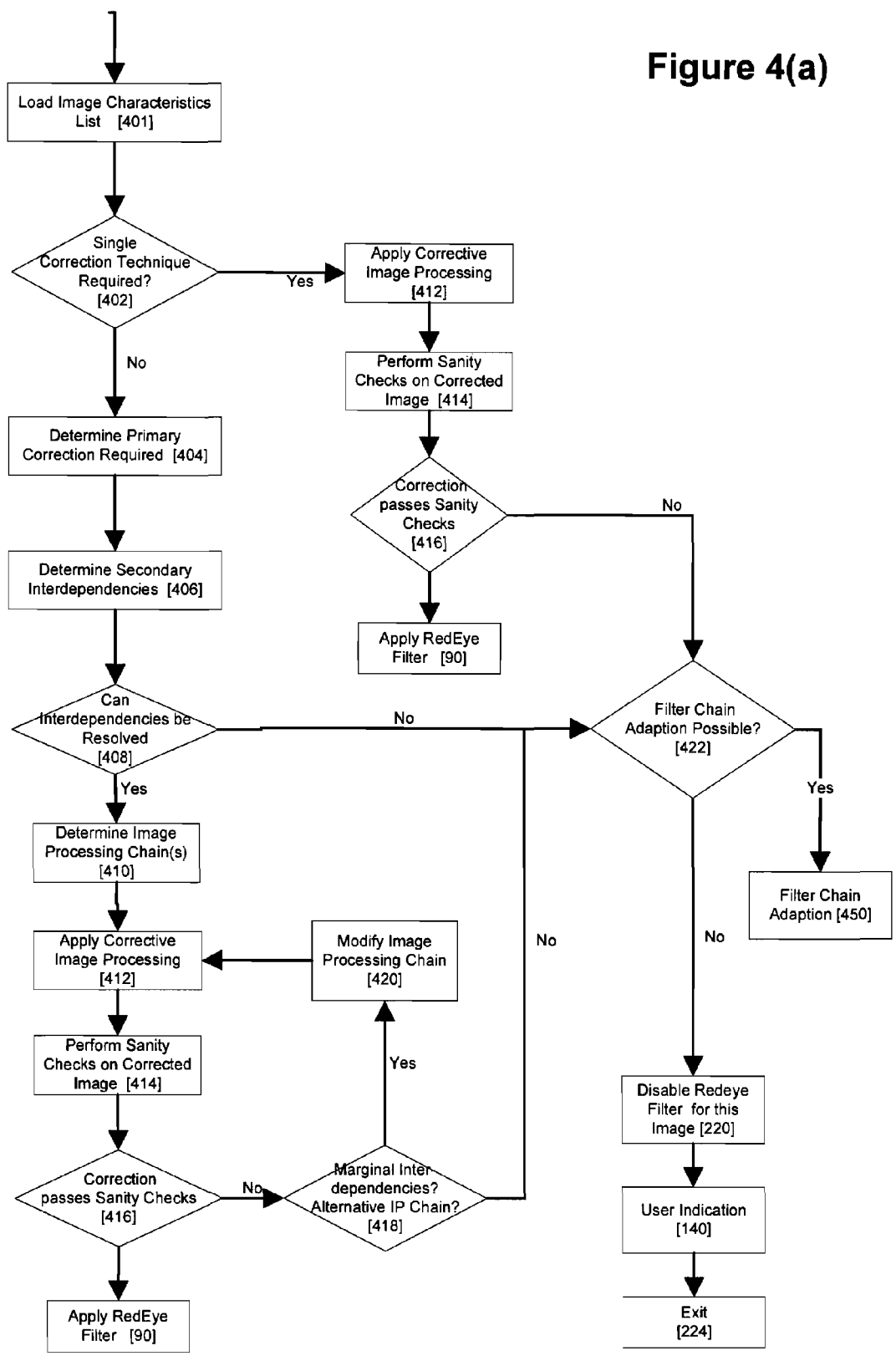
FIG. 4(a) illustrates the operation of portions of FIGS. 2(a), 2(b), 2(d) & 2(e) in more detail.
Figure 4B:
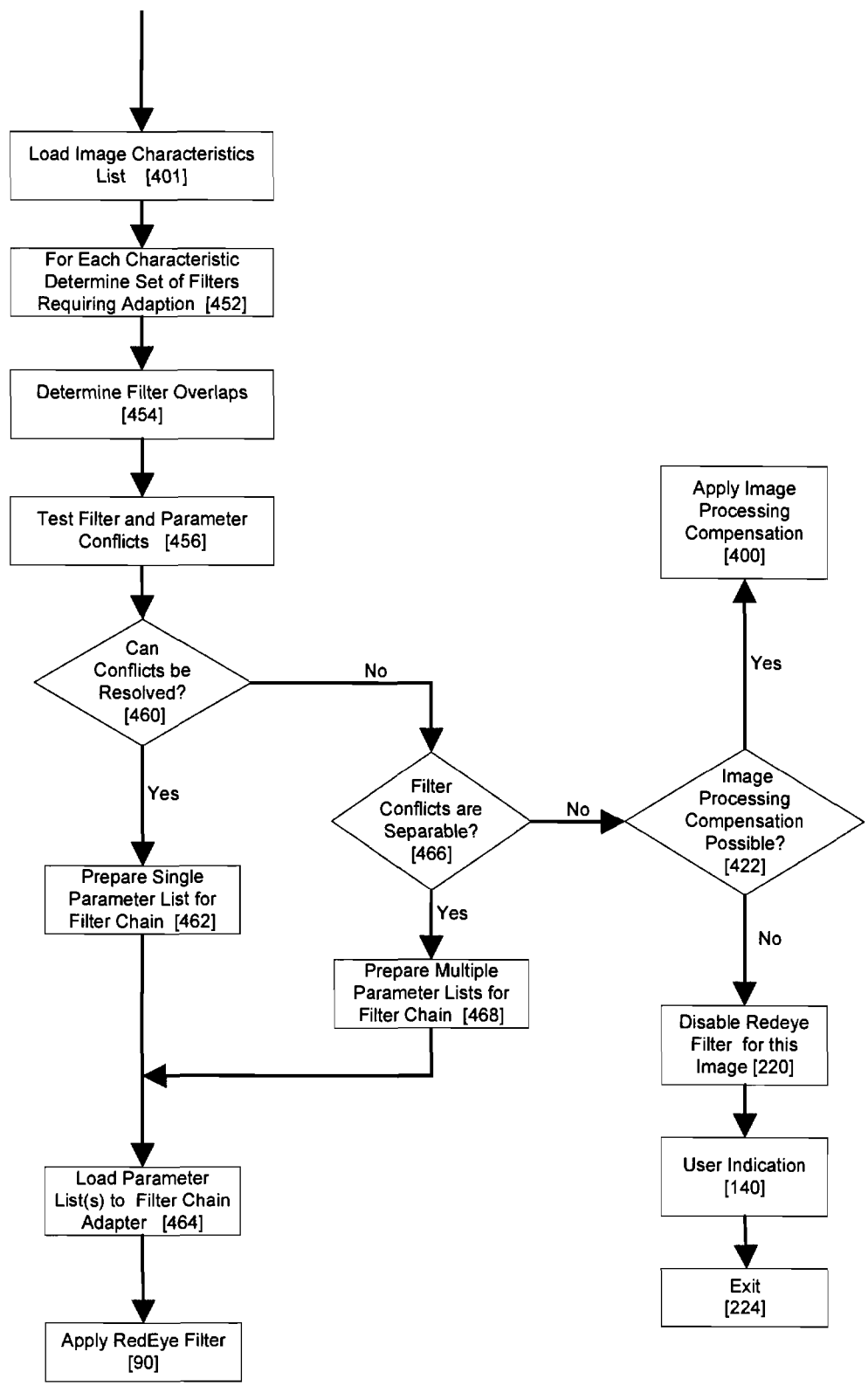
FIG. 4(b) illustrates an alternative implementation of FIG. 4(a)

FIG. 4 shows in more detail the operation of the image analysis 130 and image compensation prefilters 135. In this example the operation of the compensation prefilter 135, and more particularly the operation of the image correction analyzer 135-2 has been separated into two functional modes: FIG. 4(a) illustrates the workflow for the determining and performing corrective image processing (so corresponding generally to steps 206, 208 of FIGS. 2(a),(b),(d) and (e)) while FIG. 4(b) describes the determining and performing filter chain adaption including determining if a single chain, or a combination of multiple filter chains will compensate for the non-optimal image characteristics determined by the image analysis prefilter 130 (so corresponding generally to step 250,252 and 254 of FIGS. 2(*c*) and 2(*d*)). FIG. 4(*c*) illustrates an exemplary embodiment of the workflow of the image analysis prefilter 130.

In FIG. 4(*a*) the image correction analyzer 135-2 first loads an image characteristic list 401 obtained from the image analysis prefilter 130. This list will allow the correction analyzer to quickly determine if a simple image correction is required or if a number of image characteristics will require correction 402. In the case of a single characteristic the correction analyzer can immediately apply the relevant corrective image processing 412 followed by some tests of the corrected image 414 to ensure that image quality is at least not deteriorated by the applied corrective technique. If these tests are passed 416 then the image can be passed on to the redeye filter 90 for eye defect correction. Otherwise, if corrective image processing has failed the sanity tests 416 then an additional test may be made to determine if filter chain adaption is possible 422. In this case the algorithm will initiate the workflow described in FIG. 4(*b*) for determining the required filter chain adaptions 450. If corrective image processing has failed 416 and filter chain adaption is not possible 422 then the correction analyzer will disable the redeye filter for this image 220, and provide a user indication to that effect 140 after which it will pass control back to the main in-camera application 224. Note that in certain embodiments the user indication may be interactive and may provide an option to allow the normal redeye filter process to proceed on the uncorrected image, or alternatively offer additional user-selectable choices for additional image analysis and/or correction strategies.

Now returning to the determining step between single and multiple image characteristics requiring correction 402 we now describe the correction approach for multiple image characteristics. Typically an image which was non-optimally acquired will suffer from one major deficiency and a number of less significant deficiencies. We will refer to these as primary and secondary image deficiencies. The next step in the workflow process is to determine the primary image deficiency 404. After this has been successfully determined from the image characteristics list the next step is to determine the interdependencies between this primary correction required and said secondary image characteristics. Typically there will be more than one approach to correcting the primary image characteristic and the correction analyzer must next determine the effects of these alternative correction techniques on the secondary image characteristics 406 before correction can be initiated. If any of the secondary characteristics are likely to deteriorate significantly and all alternative correction technique for the primary image characteristic are exhausted then the correction analyzer may determine that these interdependencies cannot be resolved 408. In the present embodiment an additional test is next made to determine if filter chain adaption is possible 422. In this case the algorithm will initiate the workflow described in FIG. 4(*b*) for determining the required filter chain adaptions 450. If corrective image processing has failed 416 and filter chain adaption is not possible 422 then the correction analyzer will disable the redeye filter for this image 220, and provide a user indication to that effect 140 after which it will pass control back to the main in-camera application 224.

Given that the secondary interdependencies can be resolved 408 the correction analyzer next proceeds to determine the image processing chain 410. In certain embodiments this step may incorporate the determining of additional corrective techniques which can further enhance the primary correction technique which has been determined. In such an embodiment the correction analyzer will, essentially, loop back through steps 404, 406, and 408 for each additional correction technique until it has optimized the image processing chain. It is further remarked that the determining of step 408 will require access to a relatively complex knowledgebase 135-4. In the present embodiment this is implemented as a series of look-up-tables (LUTs) which may be embedded in the non-volatile memory of a digital camera. The content of the knowledgebase is highly dependent on (i) the image characteristics determined by the image analysis prefilter and (ii) the correction techniques available to the compensation prefilter and (iii) the camera within which the invention operates. Thus it will be evident to those skilled in the art that the knowledgebase will differ significantly from one embodiment to another. It is also desirable that said knowledgebase can be easily updated by a camera manufacturer and, to some extent, modified by an end-user. Thus various embodiments would store, or allow updating of the knowledgebase from (i) a compact flash or other memory card; (ii) a USB link to a personal computer; (iii) a network connection for a networked/wireless camera and (iv) from a mobile phone network for a camera which incorporates the functionality of a mobile phone. In other alternative embodiments, where the camera is networked, the knowledgebase may reside on a remote server and may respond to requests from the camera for the resolving of a certain set of correction interdependencies.

An example of image characteristics determined by the image analysis prefilter is a person or type of person recognised by the analyzer 130-9. Once a person or type of person has been recognized using the face recognition analyzer, 130-9, it is preferred to determine whether a customized redeye filter set is available and if it has been loaded onto the camera. If this data is not available, or if a person could not be recognized from a detected face, a generic filter set will be applied to the detected face region. If a person is recognized, the redeye filter will be modified according to a customised profile loaded on the camera and stored in the database 135-3. In general, this profile is based on an analysis of previous images of the recognised person or type of person and is designed to optimise both the detection and correction of redeye defects for the individual or type of person.

In particular, certain types of flash eye defects may completely destroy the iris color of an eye. This can generally not be restored by conventional image processing. However, if a simple model of a person's eye is available from the image correction knowledge base 135-4 which incorporates the appropriate geometric, dimensional and color information, then much improved systems and methods of redeye correction can be provided.

Now once the corrective image processing chain has been determined it is applied to the image 412 and a number of sanity checks are applied 412 to ensure that the image quality is not degraded by the correction process 416. If these tests fail then it may be that the determined interdependencies were marginal or that an alternative image processing strategy is still available 418. If this is so then the image processing chain is modified 420 and corrective image processing is reapplied 412. This loop may continue until all alternative image processing chains have been exhausted. It is further remarked that the entire image processing chain may not be applied each time. For example, if the differences between image processing chains is a single filter then a temporary copy of the input image to that filter is kept and said filter is simply reapplied with different parameter settings. If, however step 418 determines that all corrective measures have been tried it will next move to step 422 which determines if filter chain adaption is possible. Now returning to step 416, if the corrective image processing is applied successfully then the image is passed on to the redeye filter 90.

FIG. 4(b) describes an alternative embodiment of the correction analyzer 135-2 which determines if filter chain adaption is possible and then modifies the redeye filter appropriately. Initially the image characteristics list is loaded 401 and for each characteristic a set of filters which require adaption is determined 452. This is achieved through referencing the external database 135-3 and the comments and discussion provided in the context of the image correction knowledgebase 135-4 apply equally here.

Now once the filter lists for each image characteristic have been determined the correction analyzer must determine which filters overlap a plurality of image characteristics 454 and, additionally determine if there are conflicts between the filter adaptions required for each of the plurality of image characteristics 456. If such conflicts exist the correction analyzer must next decide if they can be resolved 460. To provide a simple illustrative example we consider two image characteristics which both require an adaption of the threshold of the main redness filter in order to compensate for the measured non-optimallity of each. If the first characteristic requires a lowering of the redness threshold by, say, 10% and the second characteristic requires a lowering of the same threshold by, say 15% then the correction analyzer must next determine from the knowledgebase the result of compensating for the first characteristic with a lowered threshold of 15% rather than the initially requested 10%. Such an adjustment will normal be an inclusive one and the correction analyzer may determine that the conflict can be resolved by adapting the threshold of the main redness filter to 15%. However it might also determine that the additional 5% reduction in said threshold will lead to an unacceptable increase in false positives during the redeye filtering process and that this particular conflict cannot be simply resolved.

If such filter conflicts cannot be simply resolved an alternative is to determine if they are separable 466. If they are separable that implies that two distinct redeye filter processes can be run with different filter chains and the results of the two detection processes can be merged prior to correcting the defects. In the case of the example provided above this implies that one detection process would be run to compensate for a first image characteristic with a threshold of 10% and a second detection process will be run for the second image characteristic with a threshold of 15%. The results of the two detection processes will then be combined in either an exclusive or an inclusive manner depending on the separability determination obtained from the subfilter database 135-3. In embodiments where a face recognition module 130-9 is employed, a separate detection process may be determined and selectively applied to the image for each known person.

Returning to step 460, we see that if filter conflicts can be resolved, the correction analyzer will prepare a single filter chain parameter list 462 which will then be loaded 464 to the filter chain adapter 99 of the redeye filter 90 illustrated in FIG. 3. Alternatively, if filter conflicts cannot be resolved, but are determined to be separable 466 the correction analyzer prepares a number of parameter lists 468 for the filter chain adapter which are then loaded 464 as in the previous case. The redeye filter is then applied 90.

However, if filter conflicts cannot be resolved and are not separable the correction analyzer will then make a determination if image processing compensation might be possible 422. If so then the image processing compensation workflow of FIG. 4(a) may be additionally employed 400. If it is determined that image processing compensation is not possible then the correction analyzer will disable the redeye filter for this image 220, and provide a user indication to that effect 140 after which it will pass control back to the main in-camera application 224.

Figure 4C:
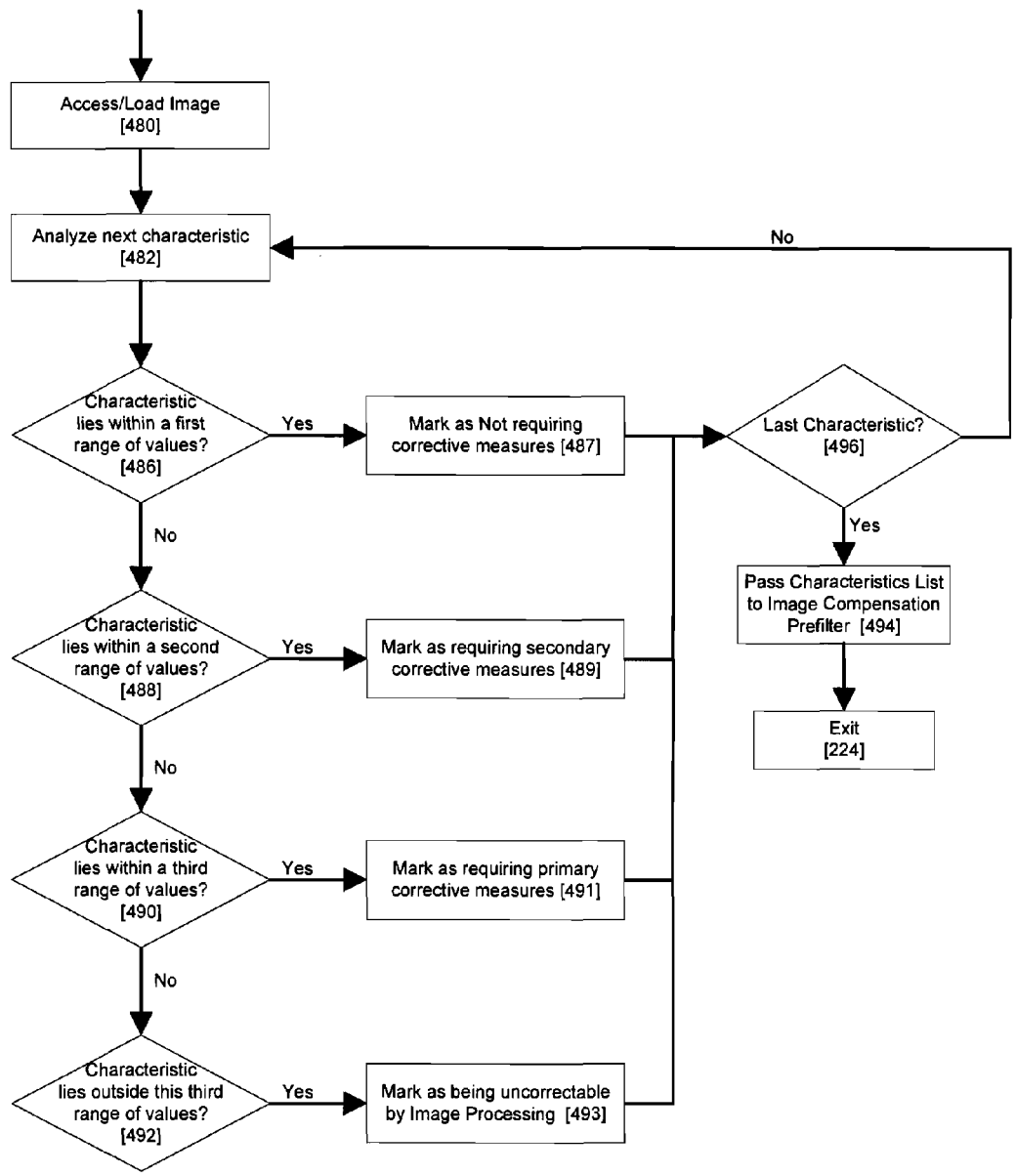
FIG. 4(c) is a flowchart illustrating the operation of a portion of the system of FIG. 1(b)

FIG. 4(c) describes the workflow of the image analysis prefilter 130 illustrated in FIG. 1(b). This performs an image processing analysis of at least one image characteristic according to at least one of a plurality of image processing techniques. Preferably, the output of this analysis should be a simple measure of goodness of the analyzed image characteristic. For the purposes of an exemplary discussion we suppose that said measure is a percentage of the optimum for said characteristic. Thus 100% represents perfect quality for the measured image characteristic; values above 95% represent negligible image distortions/imperfections in said characteristic; values above 85% represent noticeable, but easily correctable distortions/imperfections and values above 60% represent major distortions/imperfections which require major image processing to correct the image characteristic. Values below 60% imply that the image is too badly distorted to be correctable.

The first step in this workflow is to load or, if it is already loaded in memory, to access the image to be analyzed. The analysis prefilter next analyzes a first characteristic of said image 482 and determines a measure of goodness. Now if said characteristic is above a first threshold (95%) 486 then it is marked as not requiring corrective measures 487 in the characteristic list. If it is below said first threshold, but above a second threshold (85%) 488 then it is marked as requiring secondary corrective measures 489. If it is below said second threshold, but above a third threshold (60%) 490 then it is marked as requiring primary corrective measures 491 and if below said third threshold 492 it is marked as uncorrectable 493. Now it is remarked that for some embodiments of the present invention which combine corrective image processing with filter chain adaption there may be two distinct sets of thresholds, one relating to the correctability using image processing techniques and the second relating to the degree of compensation possible using filter chain adaption. We further remark that for image compensation through filter chain adaption that certain filters may advantageously scale their input parameters directly according to the measure of goodness of certain image characteristics. As an illustrative example consider the redness threshold of the main color filter which, over certain ranges of values, may be scaled directly according to a measure of excessive "redness" in the color balance of a non-optimally acquired image. Thus, the image characteristic list may additionally include the raw measure of goodness of each image characteristic. In an alternative embodiment only the raw measure of goodness will be exported from the image analysis prefilter 130 and the threshold based determining of FIG. 4(c) will be performed within the correction analyzer 135-2 in which case threshold values may be determined from the image correction knowledgebase 135-4.

Returning to 493 we note that images of such poor quality may require a second image acquisition process to be initiated and so it is implicit in 493 that for certain embodiments of the present invention it may be desirable that an alarm/interrupt indication is sent to the main camera application.

Now the main loop continues by determining if the currently analyzed characteristic is the last image characteristic to be analyzed 496. If not it returns to analyzing the next image characteristic 482. If it is the last characteristic it then passes the image characteristics list to the image compensation prefilter 494 and returns control to the main camera application 224. It should be remarked that in certain embodiments that a plurality of image characteristics may be grouped together and analyzed concurrently, rather than on a one-by-one basis. This may be preferable if several image characteristics have significant overlap in the image processing steps required to evaluate them. It may also be preferable where a hardware co-processor or DSP unit is available as part of the camera hardware and it is desired to batch run or parallelize the computing of image characteristics on such hardware subsystems.

A third principle embodiment of the present invention has already been briefly described. This is the use of a global pixel-level transformation of the image within the redeye filter itself and relies on the corrective image processing, as determined by the correction analyzer 135-2, being implementable as a global pixel-level transformation of the image. Those skilled in the art will realize that such a requirement implies that certain of the image analyzer elements which comprise the image analysis prefilter 130 are not relevant to this embodiment. For example dust analysis, object/region analysis, noise analysis and certain forms of image blur cannot be corrected by such transformations. However many other image characteristics are susceptible to such transformations. Further, we remark that this alternative embodiment may be combined with the other two principle embodiments of the invention to compliment each other.

In FIG. 5(a) we illustrate an exemplary embodiment of the red pixel locating and red region segmenting workflow which occurs within the redeye filter as steps 92-1 and 92-2. This workflow has been modified to incorporate a global pixel-level transformation 92-0 of the image as an integral element of the color determining and region grouping steps of the redeye filter. It is implicit in this embodiment that the correction analyzer has determined that a global pixel level transformation can achieve the required image compensation. The image to be processed by the redeye filter is first loaded 502 and the labeling LUT for the region grouping process in initialized 504. Next the current pixel and pixel neighbourhoods are initialized 506.

FIG. 5(b) shows a diagrammatic representation of a 4-pixel neighborhood 562, shaded light gray in the figure and containing the three upper pixels and the pixel to the left of the current pixel 560, shaded dark gray in the figure. This 4-pixel neighborhood is used in the labeling algorithm of this exemplary embodiment. A look-up table, LUT, is defined to hold correspondence labels.

Returning to step 506 we see that after initialization is completed the next step for the workflow of FIG. 5(a) is to begin a recursive iteration through all the pixels of an image in a raster-scan from top-left to bottom-right. The first operation on each pixel is to apply the global pixel transformation 508. It is assumed that the loaded image is an RGB bitmap and the global pixel transformation is of the form:

P(R,G,B)-->P(R',G',B'), where the red, green and blue values of the current pixel, P(R,G,B) are mapped to a shifted set of color space values, P(R',G',B'). There are a number of advantages in performing this corrective transformation at the same time as the color determining and pixel grouping. In particular it is easier to optimize the computational performance of the algorithm which is important for in-camera implementations. Following step 508 the workflow next determines if the current pixel satisfies membership criteria for a candidate redeye region 510. Essentially this implies that the current pixel has color properties which are compatible with an eye defect; this does not necessarily imply that the pixel is red as a range of other colors can be associated with flash eye defects. If the current pixel satisfies membership criteria for a segment 510, i.e., if it is sufficiently "red", then the algorithm checks for other "red" pixels in the 4-pixel neighborhood 512. If there are no other "red" pixels, then the current pixel is assigned membership of the current label 530. The LUT is then updated 532 and the current label value is incremented 534. If there are other "red" pixels in the 4-pixel neighborhood then the current pixel is given membership in the segment with the lowest label value 514 and the LUT is updated accordingly 516. After the current pixel has been labeled as part of a "red" segment 512 or 530, or has been categorized as "non-red" during step 510, a test is then performed to determine if it is the last pixel in the image 518. If the current pixel is the last pixel in the image then a final update of the LUT is performed 540. Otherwise the next image pixel is obtained by incrementing the current pixel pointer 520 and returning to step 508 and is processed in the same manner. Once the final image pixel is processed and the final LUT completed 540, all of the pixels with segment membership are sorted into a labeled-segment table of potential red-eye segments 542.

With regard to the exemplary details of corrective image processing 135-1 which may be employed in the present invention we remark that a broad range of techniques exist for automatic or semi-automatic image correction and enhancement. For ease of discussion we can group these into 6 main subcategories as follows:

(i) Contrast Normalization and Image Sharpening.
(ii) Image Color Adjustment and Tone Reproduction Scaling.
(iii) Exposure Adjustment and Digital Fill Flash
(iv) Brightness Adjustment with Color Space Matching; Image Auto-Gamma determination with Image Enhancement.
(v) In-Camera Image Enhancement
(vi) Face Based Image Enhancement All categories may be global correction or local region based.

(i) Contrast Normalization and Image Sharpening:

U.S. Pat. No. 6,421,468 to Ratnakar et al. disclose sharpening an image by transforming the image representation into a frequency-domain representation and by selectively applying scaling factors to certain frequency domain characteristics of an image. The modified frequency domain representation is then back-transformed into the spatial domain and provides a sharpened version of the original image. U.S. Pat. No. 6,393,148 to Bhaskar discloses automatic contrast enhancement of an image by increasing the dynamic range of the tone levels within an image without causing distortion or shifts to the color map of said image.

(ii) Color Adjustment and Tone Scaling of a Digital Image:

US patent application 2002/0105662 to Patton et al. discloses modifying a portion of an image in accordance with colormetric parameters. More particularly it discloses the steps of (i) identifying a region representing skin tone in an image; (ii) displaying a plurality of renderings for said skin tone; (iii) allowing a user to select one of said renderings and (iv) modifying the skin tone regions in the images in accordance with the rendering of said skin tone selected by the user. U.S. Pat. No. 6,438,264 to Gallagher et al. discloses compensating image color when adjusting the contrast of a digital color image including the steps of (i) receiving a tone scale function; (ii) calculating a local slope of the tone scale function for each pixel of the digital image; (iii) calculating a color saturation signal from the digital color image and (iv) adjusting the color saturation signal for each pixel of the color image based on the local tone scale slope. The image enhancements of Gallagher et al. are applied to the entire image and are based on a global tone scale function. Thus this technique may be implemented as a global pixel-level color space transformation. U.S. Pat. No. 6,249,315 to Holm teaches how a spatially blurred and sub-sampled version of an original image can be used to obtain statistical characteristics of a scene or original image. This information is combined with the tone reproduction curves and other characteristics of an output device or media to provide an enhancement strategy for optimized output of a digital image. All of this processing can be performed automatically, although the Holm also allows for simple, intuitive manual adjustment by a user.

(iii) Digital Fill Flash and Post-Acquisition Exposure Adjustment

US patent application 2003/0052991 to Stavely et al. discloses simulating fill flash in digital photography. In Stavely a digital camera shoots a series of photographs of a scene at various focal distances. These pictures are subsequently analyzed to determine the distances to different objects in the scene. Then regions of these pictures have their brightness selectively adjusted based on the aforementioned distance calculations and are then combined to form a single, photographic image. US patent application 2001/0031142 to Whiteside is concerned with a scene recognition method and a system using brightness and ranging mapping. It uses autoranging and brightness measurements to adjust image exposure to ensure that both background and foreground objects are correctly illuminated in a digital image. Much of the earlier prior art is focused on the application of corrections and enhancement of the entire image, rather than on selected regions of an image and thus discuss the correction of image exposure and tone scale as opposed to fill flash. Example patents include U.S. Pat. No. 6,473,199 to Gilman et al. which describes a method for correcting for exposure in a digital image and includes providing a plurality of exposure and tone scale correcting nonlinear transforms and selecting the appropriate nonlinear transform from the plurality of nonlinear transforms and transforming the digital image to produce a new digital image which is corrected for exposure and tone scale. U.S. Pat. No. 5,991,456 to Rahman et al. describes a method of improving a digital image. The image is initially represented by digital data indexed to represent positions on a display. The digital data is indicative of an intensity value Ii (x,y) for each position (x,y) in each i-th spectral band. The intensity value for each position in each i-th spectral band is adjusted to generate an adjusted intensity value for each position in each i-th spectral band. Each surround function Fn (x,y) is uniquely scaled to improve an aspect of the digital image, e.g., dynamic range compression, color constancy, and lightness rendition. For color images, a novel color restoration step is added to give the image true-to-life color that closely matches human observation.

However some of the earlier prior art does teach the concept of regional analysis and regional adjustment of image intensity or exposure levels. U.S. Pat. No. 5,818,975 to Goodwin et al. teaches area selective exposure adjustment. Goodwin describes how a digital image can have the dynamic range of its scene brightness reduced to suit the available dynamic brightness range of an output device by separating the scene into two regions—one with a high brightness range and one with a low brightness range. A brightness transform is derived for both regions to reduce the brightness of the first region and to boost the brightness of the second region, recombining both regions to reform an enhanced version of the original image for the output device. This technique is analogous to an early implementation of digital fill flash. Another example is U.S. Pat. No. 5,724,456 to Boyack et al. which teaches brightness adjustment of images using digital scene analysis. Boyack partitions the image into blocks and larger groups of blocks, known as sectors. It then determines an average luminance block value. A difference is determined between the max and min block values for each sector. If this difference exceeds a pre-determined threshold the sector is marked active. A histogram of weighted counts of active sectors against average luminance sector values is plotted and the histogram is shifted to using a pre-determined criteria so that the average luminance sector values of interest will fall within a destination window corresponding to the tonal reproduction capability of a destination application or output device.

(iv) Brightness Adjustment; Color Space Matching; Auto-Gamma.

Another area of image enhancement in the prior art relates to brightness adjustment and color matching between color spaces. For example U.S. Pat. No. 6,459,436 to Kumada et al. describes transforming image date from device dependent color spaces to device-independent Lab color spaces and back again. Image data is initially captured in a color space representation which is dependent on the input device. This is subsequently converted into a device independent color space. Gamut mapping (hue restoration) is performed in the device independent color space and the image data may then be mapped back to a second device-dependent color space. U.S. Pat. No. 6,268,939 to Klassen et al. is also concerned correcting luminance and chrominance data in digital color images. More specifically Klassen is concerned with optimizing the transformations between device dependent and device independent color spaces by applying subsampling of the luminance and chrominance data. Another patent in this category is U.S. Pat. No. 6,192,149 to Eschback et al. which discloses improving the quality of a printed image by automatically determining the image gamma and then adjusting the gamma of a printer to correspond to that of the image. Although Eschback is concerned with enhancing the printed quality of a digital image and not the digital image itself, if does teach a means for automatically determining the gamma of a digital image. This information could be used to directly adjust image gamma, or used as a basis for applying other enhancements to the original digital image. U.S. Pat. No. 6,101,271 to Yamashita et al. discloses implementing a gradation correction to an RGB image signal which allows image brightness to be adjusted without affecting the image hue and saturation.

(v) In-Camera Image Enhancement

U.S. Pat. No. 6,516,154 to Parulski et al. discloses suggesting improvements to a digital image after it has been captured by a camera. The user may crop, re-size or adjust color balance before saving a picture; alternatively the user may choose to re-take a picture using different settings on the camera. The suggestion of improvements is made by the camera user-interface. However Parulski does not teach the use of image analysis and corrective image processing to automatically initiate in-camera corrective actions upon an acquired digital image.

(vii) Face-Based Image Enhancement

In US patent application 20020172419, Lin et al., discloses automatically improving the appearance of faces in images based on automatically detecting such images in the digital image. Lin describes modification of lightness contrast and color levels of the image to produce better results.

Additional methods of face-based image enhancement are described in co-pending U.S. application Ser. No. 11/024,046, which is hereby incorporated by reference.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. One or more processor-readable storage media having embedded therein processor-readable code for programming a processor to perform a method of detecting one or more flash-induced eye defects in an acquired digital image, wherein the method comprises:
    a) acquiring a first image;
    b) analyzing the first acquired image to detect one or more image acquisition conditions of the image;
    c) determining if a chain of one or more defect filters can be adapted in accordance with said one or more image acquisition conditions;
    d) adapting said defect filter chain; and
    e) applying said filter chain to detect one or more flash-induced eye defects in a second acquired image.

2. The one or more processor-readable storage media of claim 1, wherein the method further comprises:
    f) determining if one or more corrective processes can be beneficially applied to said first acquired image according to said one or more conditions; and
    g) applying one or more of such corrective processes to said first acquired image.

3. The one or more processor-readable storage media of claim 2, wherein said corrective processes comprise one or more of: (i) contrast normalization and image sharpening; (ii) image color adjustment and tone scaling; (iii) exposure adjustment and digital fill flash; (iv) brightness adjustment with color space matching; (v) image auto-gamma determination with image enhancement; (v) image enhancement; and (vi) face based image enhancement.

4. The one or more processor-readable storage media of claim 2, wherein the method further comprises, responsive to determining that corrective processing is necessary but cannot be beneficially applied to said first acquired image according to said one or more conditions, disabling the corrective processing and providing an indication of such to a user.

5. The one or more processor-readable storage media of claim 2, wherein the applying a corrective process includes performing a color or luminance space transformation, or both.

6. The one or more processor-readable storage media of claim 2, wherein the method further comprises determining a sequence in which more than one corrective process can be beneficially applied to said first acquired image according to said one or more conditions.

7. The one or more processor-readable storage media of claim 1, in which said adapting comprises providing an altered set of parameters for one or more filters of said filter chain.

8. The one or more processor-readable storage media of claim 1, in which said adapting comprises re-ordering a sequence in which said filters are applied to said first acquired image.

9. The one or more processor-readable storage media of claim 1, in which said adapting comprises determining which filters are to be applied in said chain.

10. The one or more processor-readable storage media of claim 1, wherein said analyzing comprises recognizing one or more faces in the first acquired image.

11. The one or more processor-readable storage media of claim 1, wherein said filter chain comprises: (i) a pixel locator and segmentor; (ii) a shape analyser; (iii) a falsing analyser; and (iv) a pixel modifier.

12. The one or more processor-readable storage media of claim 11, wherein said pixel locator and segmentor includes a pixel transformer.

13. The one or more processor-readable storage media of claim 1, wherein the analyzing comprises recognizing one or more types of faces in the first acquired image.

14. The one or more processor-readable storage media of claim 13, wherein the method further comprises recognizing a same type of face in a second acquired image as in said first acquired image, and applying one or more same corrective processes to said second image as said first image.

15. A digital image acquisition and processing device comprising a lens, an image sensor, a processor and a processor-readable storage medium having embedded therein processor-readable code for programming the processor to perform a method for detecting flash-induced eye defects in an acquired digital image, wherein the method comprises:
    a) acquiring a first image;
    b) analyzing the first acquired image to detect one or more image acquisition conditions of the image;
    c) determining if a chain of one or more defect filters can be adapted in accordance with said one or more image acquisition conditions;
    d) adapting said defect filter chain; and
    e) applying said filter chain to detect a flash-induced eye defect in a second acquired image.

16. The device of claim 15, wherein the method further comprises:
    f) determining if one or more corrective processes can be beneficially applied to said first acquired image according to said one or more conditions; and
    g) applying one or more of such corrective processes to said first acquired image.

17. The device of claim 16, wherein said corrective processes comprise one or more of: (i) contrast normalization and image sharpening; (ii) image color adjustment and tone scaling; (iii) exposure adjustment and digital fill flash; (iv) brightness adjustment with color space matching;
    (v) image auto-gamma determination with image enhancement; (v) image enhancement; and (vi) face based image enhancement.

18. The device of claim 16, wherein the method further comprises, responsive to determining that corrective processing is necessary but cannot be beneficially applied to said first acquired image according to said one or more conditions, disabling the corrective processing and providing an indication of such to a user.

19. The device of claim 16, wherein the applying a corrective process includes performing a color or luminance space transformation, or both.

20. The device of claim 16, wherein the method further comprises determining a sequence in which more than one corrective process can be beneficially applied to said first acquired image according to said one or more conditions.

21. The device of claim 15, in which said adapting comprises providing an altered set of parameters for one or more filters of said filter chain.

22. The device of claim 15, in which said adapting comprises re-ordering a sequence in which said filters are applied to said first acquired image.

23. The device of claim 15, in which said adapting comprises determining which filters are to be applied in said chain.

24. The device of claim 15, wherein said analyzing comprises recognizing one or more faces in the first acquired image.

25. The device of claim 15, wherein said filter chain comprises: (i) a pixel locator and segmentor; (ii) a shape analyzer; (iii) a falsing analyzer; and (iv) a pixel modifier.

26. The device of claim 25, wherein said pixel locator and segmentor includes a pixel transformer.

27. The device of claim 15, wherein the analyzing comprises recognizing one or more types of faces in the first acquired image.

28. The device of claim 27, wherein the method further comprises recognizing a same type of face in a second acquired image as in said first acquired image, and applying one or more same corrective processes to said second image as said first image.

29. A method of detecting flash-induced eye defects in an acquired digital image, wherein the method comprises using a processor in:
   a) acquiring a first image;
   b) analyzing the first acquired image to detect one or more image acquisition conditions of the image;
   c) determining if a chain of one or more defect filters can be adapted in accordance with said one or more image acquisition conditions;
   d) adapting said defect filter chain; and
   e) applying said filter chain to detect a flash-induced eye defect in a second acquired image.

30. The method device of claim 29, further comprising:
   f) determining if one or more corrective processes can be beneficially applied to said first acquired image according to said one or more conditions; and
   g) applying one or more of such corrective processes to said first acquired image.

31. The method of claim 30, further comprising, responsive to determining that corrective processing is necessary but cannot be beneficially applied to said first acquired image according to said one or more conditions, disabling the corrective processing and providing an indication of such to a user.

32. The method of claim 30, wherein the applying one or more corrective processes includes performing a color or luminance space transformation, or both.

33. The method of claim 30, wherein the method further comprises determining a sequence in which more than one corrective process can be beneficially applied to said first acquired image according to said one or more conditions.

34. The method of claim 29, wherein said adapting comprises providing an altered set of parameters for one or more filters of said filter chain.

35. The method of claim 29, wherein said adapting comprises re-ordering a sequence in which said filters are applied to said first acquired image.

36. The method of claim 29, wherein said adapting comprises determining which filters are to be applied in said chain.

* * * * *